(12) United States Patent
Ouchi et al.

(10) Patent No.: US 11,399,402 B2
(45) Date of Patent: Jul. 26, 2022

(54) BASE STATION APPARATUS, TERMINAL APPARATUS, AND COMMUNICATION METHOD USING DOWNLINK CONTROL INFORMATION FORMAT AND HIGHER LAYER PARAMETER

(71) Applicants: Sharp Kabushiki Kaisha, Sakai (JP); FG Innovation Company Limited, Tuen Mun (HK)

(72) Inventors: Wataru Ouchi, Sakai (JP); Shoichi Suzuki, Sakai (JP); Tomoki Yoshimura, Sakai (JP); Liqing Liu, Sakai (JP); Taewoo Lee, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 48 days.

(21) Appl. No.: 16/969,216

(22) PCT Filed: Feb. 15, 2019

(86) PCT No.: PCT/JP2019/005585
§ 371 (c)(1),
(2) Date: Aug. 12, 2020

(87) PCT Pub. No.: WO2019/160089
PCT Pub. Date: Aug. 22, 2019

(65) Prior Publication Data
US 2020/0413463 A1    Dec. 31, 2020

(30) Foreign Application Priority Data

Feb. 15, 2018   (JP) .............................. JP2018-024864

(51) Int. Cl.
*H04W 76/15*    (2018.01)
*H04W 76/11*    (2018.01)
(Continued)

(52) U.S. Cl.
CPC ........... *H04W 76/15* (2018.02); *H04L 1/1819* (2013.01); *H04L 5/0055* (2013.01); *H04L 5/14* (2013.01);
(Continued)

(58) Field of Classification Search
CPC ... H04W 76/15; H04W 48/16; H04W 72/042; H04W 72/0453; H04W 76/11;
(Continued)

(56) References Cited

U.S. PATENT DOCUMENTS

2017/0332377 A1* 11/2017 Tseng ................. H04W 72/0413
2018/0007709 A1*  1/2018 Seo ..................... H04W 72/1278
2018/0167129 A1*  6/2018 Aiba .................... H04B 7/0822

FOREIGN PATENT DOCUMENTS

EP      3081031 A1    10/2016
WO   2015/088046 A1     6/2015

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, pp. 1-86.

(Continued)

Primary Examiner — Kiet Tang
(74) Attorney, Agent, or Firm — Keating & Bennett, LLP

(57) ABSTRACT

The present invention includes: a receiver configured to receive a DCI format used for scheduling a PDSCH, and a higher layer parameter including a parameter subframeAssignment-r15; and a transmitter configured to transmit a HARQ-ACK corresponding to the PDSCH, wherein in a case that a duplex mode of a primary cell is an FDD, whether the number of bits in a HARQ process number field in the DCI format is three bits or four bits is determined, based on whether or not an EN-DC is configured, whether or not the (Continued)

| Set # | (other serving cell UL/DL configuration, serving cell UL/DL configuration) | UL-reference UL/DL configuration |
|---|---|---|
| Set 1 | (1, 1), (1, 2), (1, 3), (1, 4), (1, 5) | 1 |
| | (2, 2), (2, 5) | 2 |
| | (3, 3), (3, 4), (3, 5) | 3 |
| | (4, 4), (4, 5) | 4 |
| | (5, 5) | 5 |
| Set 2 | (1, 0), (2, 0), (3, 0), (4, 0), (5, 0) | 0 |
| | (2, 1), (4, 1), (5, 1) | 1 |
| | (5, 2) | 2 |
| | (4, 3), (5, 3) | 3 |
| | (5, 4) | 4 |
| | (1,6), (2,6), (3, 6), (4, 6), (5, 6) | 6 |
| Set 3 | (3, 1) | 1 |
| | (3, 2), (4, 2) | 2 |
| | (1, 3), (2, 3) | 3 |
| | (2, 4) | 4 |
| Set 4 | (0, 0), (6, 0) | 0 |
| | (0, 1), (0, 2), (0, 4), (0, 5), (6, 1), (6, 2), (6, 5) | 1 |
| | (0, 3), (6, 3) | 3 |
| | (6, 4) | 4 |
| | (0, 6), (6, 6) | 6 | higher layer parameter including the parameter subframe-Assignment-r15 is configured, and whether or not the DCI format is mapped to a USS given by a C-RNTI.

12 Claims, 8 Drawing Sheets

(51) Int. Cl.

| | | |
|---|---|---|
| *H04L 1/18* | (2006.01) | |
| *H04L 5/00* | (2006.01) | |
| *H04L 5/14* | (2006.01) | |
| *H04W 48/16* | (2009.01) | |
| *H04W 72/04* | (2009.01) | |

(52) U.S. Cl.
CPC ......... *H04W 48/16* (2013.01); *H04W 72/042* (2013.01); *H04W 72/0453* (2013.01); *H04W 76/11* (2018.02)

(58) Field of Classification Search
CPC ....... H04L 1/1819; H04L 5/0055; H04L 5/14; H04L 5/0028; H04L 5/001; H04L 5/0012; H04L 5/0032; H04L 5/0082; H04L 5/1453; H04L 5/1469; H04L 5/16; H04L 1/1822; H04L 1/1854; H04L 5/0044; H04L 5/0092; H04L 27/2602; H04L 1/1864
See application file for complete search history.

(56) References Cited

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.0.0, Dec. 2017, pp. 1-51.

NTT DOCOMO, Inc., "DCI contents and formats", 3GPP TSG RAN WG1 Meeting AH 1801, R1-1800671, Jan. 22-26, 2018, pp. 1-12.

* cited by examiner

| UL/DL configuration | DL- to-UL switch point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D  Downlink subframe    S  Special subframe    U  Uplink subframe

FIG. 1

| Set # | (other serving cell UL/DL configuration, serving cell UL/DL configuration) | UL-reference UL/DL configuration |
|---|---|---|
| Set 1 | (1, 1), (1, 2), (1, 3), (1, 4), (1, 5) | 1 |
| | (2, 2), (2, 5) | 2 |
| | (3, 3), (3, 4), (3, 5) | 3 |
| | (4, 4), (4, 5) | 4 |
| | (5, 5) | 5 |
| Set 2 | (1, 0), (2, 0), (3, 0), (4, 0), (5, 0) | 0 |
| | (2, 1), (4, 1), (5, 1) | 1 |
| | (5, 2) | 2 |
| | (4, 3), (5, 3) | 3 |
| | (5, 4) | 4 |
| Set 3 | (1,6), (2,6), (3, 6), (4, 6), (5, 6) | 6 |
| | (3, 1) | 1 |
| | (3, 2), (4, 2) | 2 |
| | (1, 3), (2, 3) | 3 |
| | (2, 4) | 4 |
| Set 4 | (0, 0), (6, 0) | 0 |
| | (0, 1), (0, 2), (0, 4), (0, 5), (6, 1), (6, 2), (6, 5) | 1 |
| | (0, 3), (6, 3) | 3 |
| | (6, 4) | 4 |
| | (0, 6), (6, 6) | 6 |

FIG. 2

| Set # | (Primary cell UL/DL configuration, Secondary cell UL/DL configuration) | DL-reference UL/DL configuration |
|---|---|---|
| Set 1 | (0, 0) | 0 |
| | (1, 0), (1, 1), (1, 6) | 1 |
| | (2, 0), (2, 1), (2, 2), (2, 6) | 2 |
| | (3, 0), (3, 3), (3, 6) | 3 |
| | (4, 0), (4, 1), (4, 3), (4, 4), (4, 5) | 4 |
| | (5, 0), (5, 1), (5, 2), (5, 3), (5, 4), (5, 5), (5, 6) | 5 |
| | (6, 0), (6, 6) | 6 |
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |
| Set 4 | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 | (1, 3) | 1 |
| | (2, 3), (2, 4) | 2 |
| | (3, 1), (3, 2) | 3 |
| | (4, 2) | 4 |

FIG. 3

BASE STATION APPARATUS, TERMINAL APPARATUS, AND COMMUNICATION METHOD USING DOWNLINK CONTROL INFORMATION FORMAT AND HIGHER LAYER PARAMETER

TECHNICAL FIELD

Embodiments of the present invention relate to a technique of a base station apparatus, a terminal apparatus, and a communication method that realize efficient communication.

This application claims priority based on JP 2018-024864 filed on Feb. 15, 2018, the contents of which are incorporated herein by reference.

BACKGROUND ART

3rd Generation Partnership Project (3GPP), a standardization project, has completed standardization of Evolved Universal Terrestrial Radio Access (EUTRA), which has realized high-speed communication by employing Orthogonal Frequency Division Multiplexing (OFDM) communication scheme as well as flexible scheduling using a prescribed unit of frequency and time called a resource block. Note that communication employing the standardization technique in EUTRA may be generally referred to as Long Term Evolution (LTE).

3GPP is studying Advanced EUTRA (A-EUTRA), which realizes faster data transmission and has upper compatibility with EUTRA. EUTRA is a communication system assuming a network with base station apparatuses with a substantially similar cell configuration (cell size). In A-EUTRA, a communication system is under study assuming a network in which base station apparatuses (cells) of different configurations coexist in a same area (heterogeneous wireless network, heterogeneous network). In A-EUTRA, Dual Connectivity (DC) is adopted that simultaneously communicates by using a Cell Group (CG) including different base station apparatuses (eNB).

In 3GPP, New Radio (NR) assuming a fifth generation radio communication has been studied. NR is defined as a Radio Access Technology (RAT) different from EUTRA. EUTRA NR Dual Connectivity (EN-DC) is adopted which is DC using a CG including base station apparatuses of EUTRA and base station apparatuses of NR (NPL 2).

CITATION LIST

Non Patent Literature

NPL 1: "3GPP TR 36.881 v.0.5.0 (2015 November)", R2-157181, 4 Dec. 2015.

NPL 2: "3GPP TS 37.340 v.15.0.0 (2017 December)", December 2017.

SUMMARY OF INVENTION

Technical Problem

In a communication apparatus (terminal apparatus and/or base station apparatus), efficient communication may not be achieved.

An aspect of the present invention, which has been made in view of the above-described respects, has an object to provide a base station apparatus, a terminal apparatus, and a communication method for efficiently performing communication.

Solution to Problem (1) In order to accomplish the object described above, an aspect of the present invention is contrived to provide the following means. Specifically, a terminal apparatus according to an aspect of the present invention includes: a receiver configured to receive a Downlink Control Information (DCI) format used for scheduling a Physical Downlink Shared CHannel (PDSCH), and a higher layer parameter including a parameter subframeAssignment-r15; and a transmitter configured to transmit a Hybrid Automatic Repeat request ACKnowledgment (HARQ-ACK) corresponding to the PDSCH, wherein in a case that a duplex mode of a primary cell is a Frequency Division Duplex (FDD), whether the number of bits in a HARQ process number field in the DCI format is three bits or four bits is determined, based on whether or not an Evolved universal terrestrial radio access network New radio Dual Connectivity (EN-DC) is configured, whether or not the higher layer parameter including the parameter subframeAssignment-r15 is configured, and whether or not the DCI format is mapped to a user equipment (UE) specific search space (USS) given by a C-RNTI.

(2) A base station apparatus according to an aspect of the present invention includes: a transmitter configured to transmit a Downlink Control Information (DCI) format used for scheduling a Physical Downlink Shared CHannel (PDSCH), and a higher layer parameter including a parameter subframeAssignment-r15; and a receiver configured to receive a Hybrid Automatic Repeat request ACKnowledgement (HARQ-ACK) corresponding to the PDSCH, wherein in a case that a duplex mode of a primary cell is a Frequency Division Duplex (FDD), whether the number of bits in a HARQ process number field in the DCI format is three bits or four bits is determined, based on whether or not an Evolved universal terrestrial radio access network New radio Dual Connectivity (EN-DC) is configured, whether or not the higher layer parameter including the parameter subframeAssignment-r15 is configured, and whether or not the DCI format is mapped to a user equipment (UE) specific search space (USS) given by a C-RNTI.

(3) A communication method according to an aspect of the present invention is a communication method for a terminal apparatus, the communication method including the steps of: receiving a higher layer parameter including a parameter subframeAssignment-r15; receiving a Downlink Control Information (DCI) format used to schedule a Physical Downlink Shared CHannel (PDSCH); and transmitting a Hybrid Automatic Repeat request ACKnowledgement (HARQ-ACK) corresponding to the PDSCH, wherein in a case that a duplex mode of a primary cell is a Frequency Division Duplex (FDD), whether the number of bits in a HARQ process number field in the DCI format is three bits or four bits is determined, based on whether or not an Evolved universal terrestrial radio access network New radio Dual Connectivity (EN-DC) is configured, whether or not the higher layer parameter including the parameter subframeAssignment-r15 is configured, and whether or not the DCI format is mapped to a user equipment (UE) specific search space (USS) given by a C-RNTI.

(4) A communication method according to an aspect of the present invention is a communication method for a base station apparatus, the communication method including the steps of: transmitting a higher layer parameter including a parameter subframeAssignment-r15; transmitting a Downlink Control Information (DCI) format used to schedule a Physical Downlink Shared CHannel (PDSCH); and receiving a Hybrid Automatic Repeat request ACKnowledgement (HARQ-ACK) corresponding to the PDSCH, wherein in a case that a duplex mode of a primary cell is a Frequency Division Duplex (FDD), whether the number of bits in a HARQ process number field in the DCI format is three bits or four bits is determined, based on whether or not an Evolved universal terrestrial radio access network New radio Dual Connectivity (EN-DC) is configured, whether or not the higher layer parameter including the parameter subframeAssignment-r15 is configured, and whether or not the DCI format is mapped to a user equipment (UE) specific search space (USS) given by a C-RNTI.

Advantageous Effects of Invention

According to an aspect of the present invention, transmission efficiency can be improved in a radio communication system in which a base station apparatus and a terminal apparatus communicate with each other.

BRIEF DESCRIPTION OF DRAWINGS

FIG. 1 is a diagram illustrating an example of UL/DL configurations according to a first embodiment.

FIG. 2 is a diagram illustrating an example of UL reference UL/DL configurations according to the first embodiment.

FIG. 3 is a diagram illustrating an example of DL reference UL/DL configurations according to the first embodiment.

DESCRIPTION OF EMBODIMENTS

First Embodiment

Figure 4:
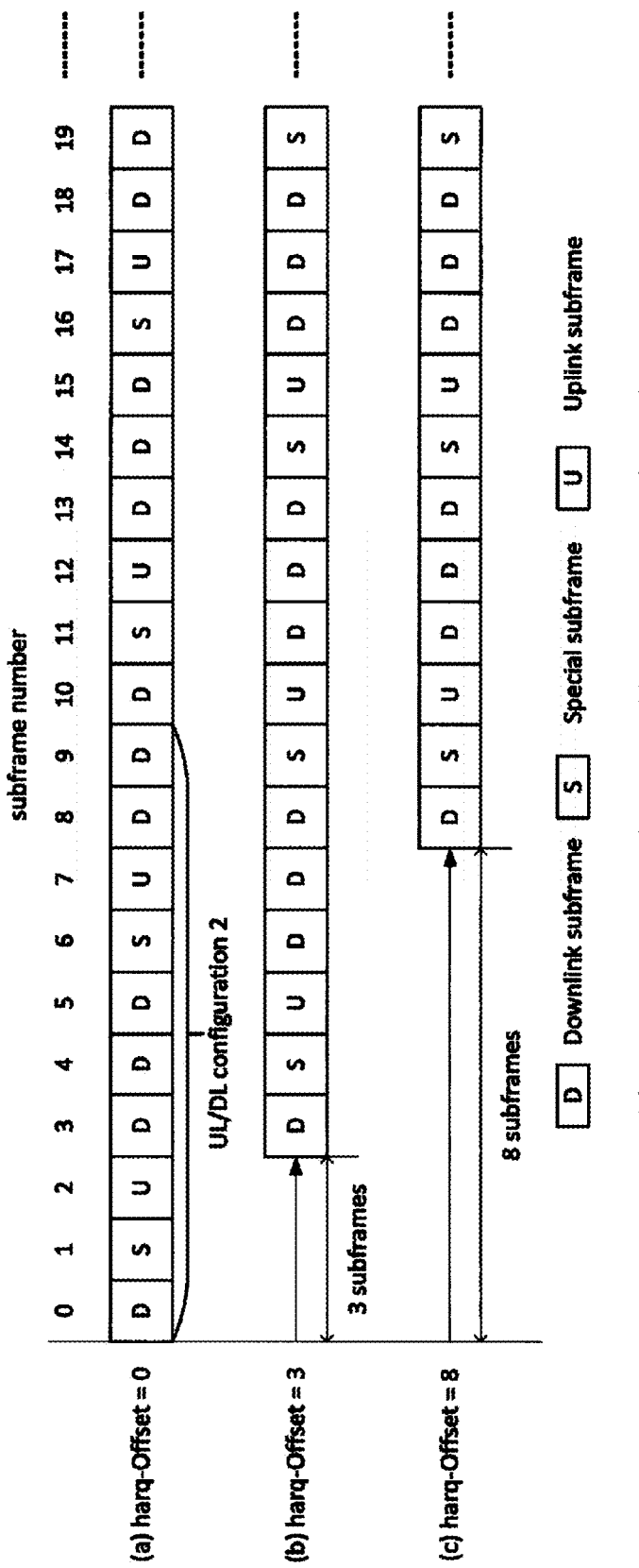
FIG. 4 is a diagram illustrating an example of an UL/DL configuration based on a higher layer parameter tdm-PatternSingle-Tx-r15 according to the first embodiment.

A first embodiment of the present invention will be described below. A description will be given by using a communication system in which a base station apparatus (base station, node B, eNB (EUTRAN NodeB, evolved NodeB), gNB, en-gNB) and a terminal apparatus (terminal, mobile station, a user apparatus, or User equipment (UE)) communicate in a cell. Note that the terminal apparatus according to the present embodiment may have a function of connecting to and communicating with a serving cell (EUTRA cell, LTE cell) configured by a base station apparatus of EUTRA, and a function of connecting to and communicating with a serving cell (NR cell) configured by a base station apparatus of NR.

Main physical channels, physical signals, and frame structures used in the present embodiment will be described. The channel refers to a medium used to transmit a signal, and the physical channel refers to a physical medium used to transmit a signal. In the present embodiment, a physical channel may be used synonymously with a physical signal. In LTE, a physical channel may be added or its structure and/or constitution or format may be changed and/or added; however, the description of the present embodiment will not be affected even in a case that a channel is changed and/or added.

A frame structure type (FS) according to the present embodiment will be described.

Frame structure type 1 (FS1) is applied to Frequency Division Duplex (FDD). In other words, FS1 is applied to a cell operation supported by FDD. FS1 can be applied to both Full Duplex-FDD (FD-FDD) and Half Duplex-FDD (HD-FDD).

In FDD, the downlink transmission and the uplink transmission are divided in the frequency domain. In other words, the operating band is defined for each of the downlink transmission and the uplink transmission. In other words, different carrier frequencies are applied in the downlink transmission and the uplink transmission. Therefore, in FDD, 10 subframes are available for each of the downlink transmission and the uplink transmission. In the HD-FDD operation, the terminal apparatus is not capable of performing transmission and reception at the same time, but in the FD-FDD operation, the terminal apparatus can perform transmission and reception simultaneously.

In the HD-FDD operation, the terminal apparatus is not capable of performing transmission and reception at the same time, but in the FD-FDD operation, the terminal apparatus can perform transmission and reception simultaneously.

Furthermore, there are two types of HD-FDD. For the type A HD-FDD operation, the guard period is generated by the terminal apparatus by not receiving the last portion (last symbol) of the downlink subframe immediately before the uplink subframe from the same terminal apparatus. For the type B HD-FDD operation, the guard periods referenced as HD a guard subframe is generated by the terminal apparatus by not receiving the downlink subframe immediately before the uplink subframe from the same terminal apparatus, and by not receiving the downlink subframe immediately after the uplink subframe from the same terminal apparatus. In other words, in the HD-FDD operation, the terminal apparatus generates the guard period by controlling reception processing of the downlink subframe. Note that the symbol may include an OFDM symbol and/or an SC-FDMA symbol.

Frame structure type 2 (FS2) is applied to Time Division Duplex (TDD). In other words, FS2 is applied to a cell operation supported by TDD. Each radio frame may include two half frames. Each half frame includes five subframes. A UL/DL configuration in a cell may be changed between radio frames. Control of subframes in the uplink or downlink transmission may be performed in the most recent radio frame. The terminal apparatus can acquire the UL/DL configuration in the most recent radio frame via the PDCCH or higher layer signaling. Note that the UL/DL configuration may indicate a configuration of an uplink subframe, a downlink subframe, and a special subframe in TDD. The special subframe may include a Downlink Pilot Time Slot (DwPTS) capable of downlink transmission, a guard period (GP), and an Uplink Pilot Time Slot (UpPTS) capable of uplink transmission. The GP may be a time domain reserved (ensured) to transition from the downlink to the uplink. The configuration of the DwPTS and the UpPTS in the special subframe is managed in a table, and the terminal apparatus can acquire the configuration of the special subframe via higher layer signaling. Note that the special subframe serves as a switching point from the downlink to the uplink. In other words, the terminal apparatus transitions from reception to transmission, bordering the switching point, and the base station apparatus transitions from transmission to reception. The switching points have a 5 ms cycle or a 10 ms cycle. In a case that the switching point is a 5 ms cycle, the special subframe is present in both half-frames. In a case that the switching point is a 10 ms cycle, the special subframe is only present in the first half frame. Note that the UL/DL configuration may be referred to as a TDD configuration or a subframe assignment.

FIG. 1 is a diagram illustrating an example of UL/DL configurations according to the present embodiment. A UL/DL configuration is used to indicate a configuration of a downlink subframe, a special subframe, and an uplink subframe for a continuous 10 subframes. The UL/DL configuration can switch (reconfigure) some patterns in response to the index.

Note that FDD and TDD may be referred to as duplex or a duplex mode. The duplex mode may be associated with an operating band and/or carrier frequency.

In a case that two symbols are allocated to an UpPTS, the SRS and PRACH preamble format 4 may be configured to be allocated in the UpPTS.

In TDD, a TDD enhanced Interference Management and Traffic Adaptation (eIMTA) technique can be applied, taking into account the amount of communication (traffic amount) and interference of each cell. eITMA is a technique which dynamically switches the TDD configuration (by using L1 level or L1 signaling) in consideration of the amount of communication and the amount of interference of the downlink and/or the uplink, and changes a ratio of the downlink subframes and the uplink subframes in the radio frame (that is, within 10 subframes), to perform optimal communication.

For FS1 and FS2, NCP and ECP are applied.

Frame structure type 3 (FS3) is applied to the Licensed Assisted Access (LAA) secondary cell operation. In other words, FS3 is applied to the LAA cell. For FS3, only NCP may be applied. The 10 subframes included in the radio frame are used for downlink transmission. The terminal apparatus processes the subframes as empty subframes, without assuming that any signal is present in the subframes unless specified or unless a downlink transmission is detected in the subframes. The downlink transmission occupies one or more continuous subframes. The continuous subframes include the first subframe and the last subframe. The first subframe starts at any symbol or slot in the subframe (for example, OFDM symbol #0 or #7). The last subframe is occupied for the number of OFDM symbols indicated based on one of a full subframe (i.e., 14 OFDM symbols) or a DwPTS period. Note that whether or not a subframe of the continuous subframes is the last subframe is indicated by a field included in the DCI format to the terminal apparatus. The field may further indicate the number of OFDM symbols used in the subframe in which the field is detected or the next subframe. In FS3, the base station apparatus performs a channel access procedure associated with LBT before downlink transmission is performed.

Note that only downlink transmission may be supported in FS3, but uplink transmission may also be supported. Whether or not uplink transmission is performed in FS3, that is, in the LAA cell, may be determined according to the capability supported by the terminal apparatus and the capability supported by the base station apparatus.

The terminal apparatus and the base station apparatus supporting FS3 may perform communication in an unlicensed frequency band.

The operating bands corresponding to cells in the LAA or FS3 may be managed together with a table of EUTRA operating bands. For example, the indexes of the EUTRA operating bands may be managed as 1 to 44, and the index of the operating band corresponding to the LAA (or LAA frequency) may be managed as 46. For example, in index 46, only downlink frequency bands may be defined. In some indexes, uplink frequency bands may be reserved or reserved in advance to be defined in the future. The corresponding duplex mode may be a duplex mode different from FDD and TDD, or may be 1-DD or TDD. The frequency at which the LAA operation is possible is preferably equal to or greater than 5 GHz, but may be equal to or less than 5 GHz. In other words, the communication of the LAA operation may be performed at the associated frequency as the operating band corresponding to the LAA.

Next, Carrier Aggregation (CA) according to the present embodiment will be described.

CA is a technique for aggregating two or more Component Carriers (CC) to support broad bandwidth (for example, up to 640 MHz) communications, to perform communication. The CC may simply be referred to as a carrier. Note that the CC may correspond to a cell. One cell may also include one or multiple CCs. The terminal apparatus can simultaneously perform reception or transmission in one or multiple CCs in accordance with the capability of the terminal apparatus. In a case that a parameter related to CA is configured by the base station apparatus, the terminal apparatus can perform communication based on the CA. CA may be supported between CCs of the same and/or different duplexes. In other words, CA using multiple CCs in the same duplex mode and CA using multiple CCs in different duplex modes may be supported depending on the capability of the terminal apparatus. Here, the CA using only FDD component carriers may be referred to as FDD CA. The CA using only FDD component carriers may be referred to as TDD CA. The CA using FDD component carriers (FDD cells) and TDD component carriers (TDD cells) in different duplex modes may be referred to as FDD-TDD CA. In addition to the information for indicating that the capability to perform CA is supported, the terminal apparatus can notify the base station apparatus by including information for indicating that the capability to perform FDD-TDD CA is supported in the capability information of the terminal apparatus.

The base station apparatus may be configured to aggregate different numbers of CCs in different bandwidths in the UL and DL.

Multiple CCs for the same base station apparatus may not have the same coverage. In other words, parameters and configurations related to power control may be set so that the CCs configured by the same base station apparatus satisfy the same coverage, or parameters and configurations related to power control may be set to satisfy different coverages.

The PDCCH of one cell (for example, PCell) may be used to perform the scheduling of the PUSCH and/or the PDSCH of other cells (for example, SCell). Such scheduling is referred to as cross carrier scheduling.

For TDD CA, the UL/DL configuration is the same (i.e., the same UL/DL configuration) between multiple CCs in the same band (the same operating band), and may be the same or different in multiple CCs in different bands (different operating bands). In other words, in a case that multiple CCs are configured in the same operating band, the same UL/DL configuration is configured between the multiple CCs, and in a case that each of the multiple CCs is configured to a different operating band, the UL/DL configuration may be configured for each CC.

In CA, there are a primary cell (PCell) and a secondary cell (SCell). The PCell may be a cell capable of transmitting and/or allocating the PUCCH, may be a cell associated with an initial access procedure/RRC connection procedure/initial connection establishment procedure, may be a cell capable of triggering a random access procedure by L1 signaling, may be a cell for monitoring a radio link, may be a cell in which Semi-Persistent Scheduling (SPS) is supported, may be a cell used to detect and/or determine a Radio Link Failure (RLF), may be a cell that is always activated (i.e. a cell that is not deactivated), or may be a cell that can add/change/delete/activate and deactivate the SCell. The SCell may be a cell that is added/changed/deleted/removed/activated and deactivated by the PCell.

In a case that the UL/DL configuration (TDD configuration) corresponding to each cell is not the same between multiple LTE cells, the terminal apparatus may perform PUSCH transmission or HARQ-ACK transmission, based on the reference UL/DL configuration. The UL/DL configuration for the PUSCH transmission from the uplink grant detection may be referred to as a UL reference UL/DL configuration, and the UL/DL configuration used for the corresponding HARQ-ACK transmission from the PDCCH/PDSCH detection may be referred to as a DL reference UL/DL configuration.

FIG. 2 is a diagram illustrating an example of UL reference UL/DL configurations. FIG. 2 illustrates an example of UL reference UL/DL configurations, based on combinations of UL/DL configurations of serving cells and UL/DL configurations of other serving cells for scheduling the serving cells. The UL reference UL/DL configurations obtained in FIG. 2 illustrate an example of uplink subframes used for transmission of the PUSCH scheduled by an uplink grant after detecting the uplink grant.

FIG. 3 is a diagram illustrating an example of DL reference UL/DL configurations. FIG. 2 illustrates an example of DL reference UL/DL configurations associated with HARQ-ACK transmission, based on combinations of UL/DL configurations of a primary cell and UL/DL configurations of a secondary cell. The DL reference UL/DL configurations obtained by FIG. 3 illustrate an example of uplink subframes on which a HARQ-ACK corresponding to the PDSCH is transmitted after the PDSCH is received.

In FDD-TDD CA, in a case that the duplex mode of the primary cell is TDD, that is, the primary cell FS2 (TDD primary cell), and in a case that the duplex mode of the first secondary cell is TDD and the duplex mode of the second secondary cell is FDD, the DL HARQ timing of the TDD secondary cell may be determined, based on the higher layer parameter (harqTimingTDD-r13) for indicating that the DL HARQ timing configured for the FDD secondary cell (second secondary cell, secondary cell FS1) is also applied to the TDD secondary cell (the first secondary cell, the secondary cell FS2). For example, the DL HARQ timing can be determined based on the DL reference UL/DL configuration. In a case that the UL/DL configurations are different for the TDD primary cell and the TDD secondary cell, the appropriate DL reference UL/DL configuration is applied based on the table in FIG. 3, and in a case that harqTimingTDD-r13 is set to 'TRUE', the DL reference UL/DL configuration for the TDD secondary cell may be the same as the DL reference UL/DL configuration applied for the FDD secondary cell. In a case that harqTimingTDD-r13 set to 'TRUE' is not configured, the DL reference UL/DL configuration for the TDD secondary cell may be determined based on the table in FIG. 3.

Next, Dual Connectivity (DC) according to the present embodiment will be described.

In DC, two Cell Groups (CGs) are configured for the terminal apparatus. The Master CG (MCG) includes one or multiple serving cells of a Master eNB (MeNB) or a Master Node (MN). The Secondary CG (SCG) includes one or multiple serving cells of a Secondary eNB (SeNB) or a Secondary Node (SN). Note that, in a case that a terminal apparatus only connects to an EUTRA base station apparatus, the DC may be referred to as intra-EUTRA-DC, EUTRA-EUTRA DC, intra-LTE DC, or LTE-LTE DC. In a case that a terminal apparatus only connects to an NR base station apparatus, the DC may be referred to as Intra NR-DC or NR-NR DC.

The MCG is a group of serving cells associated with the MN, and includes one special cell (PCell) and optionally one or multiple SCells.

The SCG is a group of serving cells associated with SN, and includes one special cell (PSCell) and optionally one or multiple SCells.

The MeNB or MN can transmit a MeNB/MN RRC reconfiguration (RRC connection reconfiguration) message including a SeNB/SN RRC reconfiguration (RRC connection reconfiguration) message to the terminal apparatus.

In each CG, in a case that multiple serving cells are configured, CA may be performed in the CG.

For the SCG, a primary secondary cell (PSCell) corresponding to the PCell is configured. For example, a PUCCH resource may be configured in the PSCell. The PSCell is not deactivated. The PSCell can be changed only in a case that the SCG is changed.

In a case that the SCG is configured, at least one of SCG bearers or split bearers is always present.

In the PSCell, in a case that a Physical Layer Problem (PLP) or a Random Access Problem (RAP) is detected, or in a case that the maximum number of RLC retransmissions associated with the SCG is reached, or in a case that a access problem in the PSCell is detected (expiration of the timer T307) during the performance of the SCG change, or the maximum transmission timing difference between CGs is exceeded, the following steps (A1) to (A4) are applied. (A1) An RRC connection re-establishment procedure is not triggered (A2) all the uplink transmissions directed to all the cells of the SCG is stopped (A3) the MeNB informs the UE of the SCG failure type (A4) the DL data transfer of the MeNB is maintained for the split bearer.

Next, EUTRA NR Dual Connectivity (EN-DC) according to the present embodiment will be described.

The EN-DC is a technique for performing DC by using a CG including one or multiple cells including base station apparatuses (eNB, ng-eNB) of EUTRA and a CG including one or multiple cells including base station apparatuses (gNB, en-gNB) of NR. At this time, the CG including base station apparatuses of EUTRA is an MCG, and the CG including base station apparatuses of NR is an SCG.

EN-DC may be referred to as Multi-RAT DC (MR-DC).

The Evolved Universal Terrestrial Radio Access Network (EUTRAN) supports the MR-DC connected to one EUTRA base station apparatus (eNB) operating as an MN and one NR base station apparatus (en-gNB) operating as an SN.

The NR base station apparatus (en-gNB) is a node that operates as an SN in EN-DC and provides an NR user plane and control plane termination for the terminal apparatus.

The terminal apparatus for which the EN-DC is configured may not be expected to be reconfigured to the intra-EUTRA-DC or the intra-NR-DC by using an RRC connection reconfiguration message. In other words, the terminal apparatus may not be expected to transition directly from the EN-DC to the intra-EUTRA-DC or the intra-NR-DC. The terminal apparatus may not be expected in a reversed case. Note that, in a case that the NR-SCG is released, the terminal apparatus may be reconfigured to the intra-EUTRA-DC or the intra-NR-DC by using an RRC connection reconfiguration message.

Next, single transmission of EN-DC according to the present embodiment will be described.

In the single transmission of the EN-DC, by specifying (limiting) the uplink subframes for the uplink transmission for an EUTRA cell by using a higher layer parameter so that an uplink transmission for an EUTRA cell (LTE cell) and an uplink transmission for an NR cell do not collide, simultaneous transmission of the EUTRA cell and the NR cell does not occur. The interference and power control burden by simultaneous transmission of different RATs is reduced.

A higher layer parameter tdm-Pattern-Single-Tx-r15 may be configured to achieve single transmission of the LTE cell. The higher layer parameter tdm-Pattern-Single-Tx-r15 may be included in the EN-DC configuration of the RRC connection reconfiguration message. The higher layer parameter tdm-Pattern-Single-Tx-r15 may include at least one or both of a parameter (subframeAssignment-r15) for configuring (defining) an uplink subframe in the LTE cell and a parameter (harq-Offset-r15) for configuring a subframe offset for HARQ transmission for the uplink subframe. Note that in a case that the harq-Offset-r15 is not included, the subframe offset for the HARQ-ACK transmission may be considered to be 0. Note that the value indicated by the subframeAssignment-r15 may correspond to an index of the UL/DL configuration. In other words, the subframeAssignment-r15 may be used to indicate the uplink subframe of the corresponding UL/DL configuration. Note that an uplink transmission of the LTE cell may be performed in the uplink subframe. The harq-Offset-r15 indicates a subframe offset to be applied to the uplink subframe. The subframe offset may be applied only in a case that the terminal apparatus transmits HARQ. In other words, in a case that the uplink data not including the HARQ-ACK is transmitted on the PUSCH, the subframe offset indicated by the harq-Offset-r15 may not be applied to the uplink subframe in the UL/DL configuration indicated by the subframeAssignment-r15. For example, in a case that the uplink data not including the HARQ-ACK is transmitted on the PUSCH, the uplink data may be transmitted on the uplink subframe indicated by the subframeAssignment-r15. In a case that the uplink data including only CSI is transmitted on the PUSCH, the uplink data may be transmitted on the uplink subframe indicated by the subframeAssignment-r15. In such a case, the terminal apparatus may assume that the harq-Offset-r15 is set to 0. In a case that the uplink data not including the HARQ-ACK is transmitted on the PUSCH, whether or not the subframe offset indicated by the harq-Offset-r15 may be configured by a higher layer parameter for indicating whether or not the harq-Offset-r15 is enabled for the PUSCH transmission only in the uplink data.

FIG. 4 is a diagram illustrating an example of a configuration of uplink subframes in a case that the higher layer parameter tdm-PatternSingle-Tx-r15 according to the present embodiment is configured. In FIG. 4, the subframeAssignment-r15 indicates UL/DL configuration 2, and the harq-Offset-r15 indicates an example of 0, 3, or 8. In an FDD cell, in a subframe indicated as D (downlink subframe), the terminal apparatus does not expect to perform uplink transmission. However, in an FDD cell, in all downlink subframes, the terminal apparatus is capable of performing reception of the PDCCH and the PDSCH.

In a case that the TDD CA is applied in the CG of the EUTRA, in other words, in a case that there is only a TDD cell in the CG of the EUTRA, the terminal apparatus may determine the DL reference UL/DL configuration for the TDD cell, based on the UL/DL configuration indicated in the harq-Offset-r15 and the subframeAssignment-r15 (i.e. two parameters included in the tdm-PatternSingle-Tx-r15) and the UL/DL configuration of the TDD cell.

In a case that the TDD CA is applied in the CG of the EUTRA, in other words, in a case that there is only a TDD cell in the CG of the EUTRA, the terminal apparatus may assumes that the harq-Offset-r15 is set to 0, and may determine the DL reference UL/DL configuration corresponding to the TDD cell, based on the UL/DL configuration indicated by the subframeAssignment-r15 and the UL/DL configuration of the TDD cell. For example, the DL reference UL/DL configuration may be determined by recycling FIG. 3. For example, by applying the primary cell UL/DL configuration of FIG. 3 as the UL/DL configuration indicated by the subframeAssignment-r15, and applying the UL/DL configuration of the TDD cell as the secondary cell UL/DL configuration, the terminal apparatus may determine the DL reference UL/DL configuration. In a case that the base station apparatus performs TDD CA in the EUTRA CG of the terminal apparatus, the base station apparatus may set the harq-Offset-r15 to 0.

In the EUTRA CG, in a case that FDD CA is applied, that is, in a case that there is only an FDD cell in the CG of the EUTRA, the terminal apparatus may determine the UL/DL configuration indicated by the harq-Offset-r15 and the subframeAssignment-r15 (in other words, two parameters included in the tdm-PatternSingle-Tx-r15) as the DL reference UL/DL configuration. At this time, the terminal apparatus and the base station apparatus may consider the subframe corresponding to the special subframe as an uplink subframe. The terminal apparatus and the base station apparatus may not expect that uplink transmission can be performed in the subframe corresponding to the special subframe. In an FDD cell to which the UL/DL configuration based on the tdm-PatternSingle-Tx-r15 is applied, whether uplink transmission can be performed in the subframe corresponding to the special subframe may be indicated by a higher layer parameter.

In a case that FDD-TDD CA is applied in the CG of the EUTRA, the terminal apparatus may determine the DL reference UL/DL configuration for the FDD cell and the TDD cell in which the UL/DL configuration indicated by the subframeAssignment-r15 is configured, assuming that the harq-Offset-r15 is set to 0. In a case that the base station apparatus performs FDD-TDD CA in the EUTRA CG of the terminal apparatus, the base station apparatus may set the harq-Offset-r15 to 0.

In a case that the CG of the EUTRA includes at least one TDD cell, the base station apparatus may set the value of the harq-Offset-r15 to 0, or may not include the harq-Offset-r15 in the tdm-PatternSingle-Tx-r15.

In order to maintain combinations of reference UL/DL configurations based on two UL/DL configurations (i.e., to not increase the number of combinations), the harq-Offset-r15 may be set to 0 in a case that the EUTRA CG includes a TDD cell. For example, the table illustrated by FIG. 3 need not be extended.

In the CG of the EUTRA, in a case that FDD-TDD CA is applied, and in a case that the higher layer parameter tdm-PatternSingle-Tx-r15 is configured, and in a case that the harqTimingTDD-r13 or the harqTimingTDD-r15 is set to 'TRUE', the DL reference UL/DL configuration for the TDD secondary cell may be applied with the same UL/DL configuration as the DL reference UL/DL configuration applied to the FDD primary cell.

In the CG of the EUTRA, in a case that FDD-TDD CA is applied, and in a case that the higher layer parameter tdm-PatternSingle-Tx-r15 is configured, and in a case that the harqTimingTDD-r13 or the harqTimingTDD-r15 is not set to 'TRUE' (or in a case that the harqTimingTDD-r13 or the harqTimingTDD-r15 set to 'TRUE' is not configured), the DL reference UL/DL for the TDD secondary cell may be determined based on the DL reference UL/DL configuration applied to the FDD primary cell and the UL/DL configuration of the TDD secondary cell.

For the FDD cell, the DL reference UL/DL configuration is determined based on the higher layer parameter tdm-PatternSingle-Tx-r15, and for the TDD cell, the DL reference UL/DL configuration may be determined based on whether or not the harqTimingTDD-r13 or the harqTimingTDD-r15 set to 'TRUE' is configured.

Next, radio frame structures of the downlink and the uplink according to the present embodiment will be described.

Figure 5:
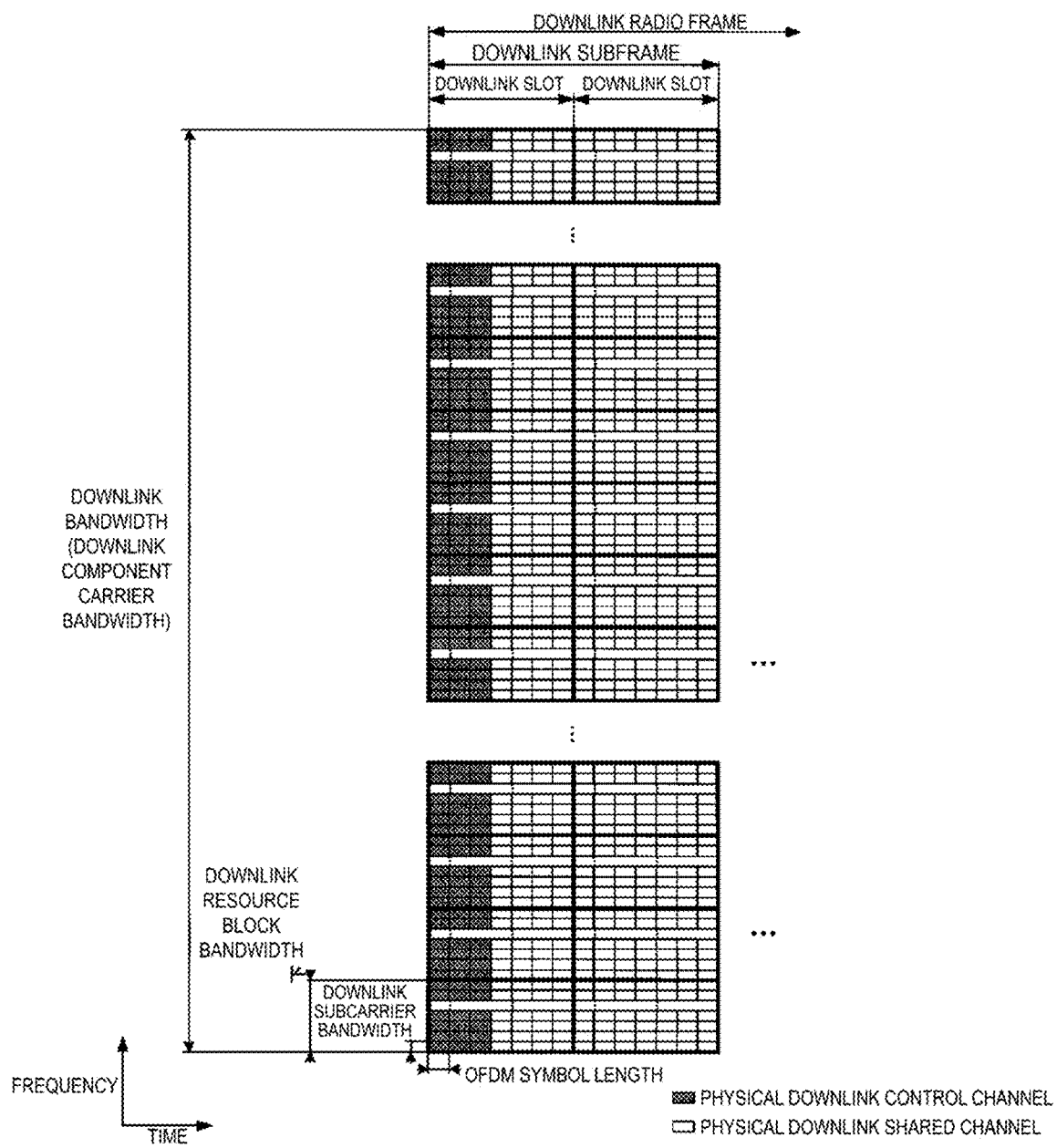
FIG. 5 is a diagram illustrating an example of a downlink radio frame structure according to the first embodiment.

FIG. 5 is a diagram illustrating an example of a downlink radio frame structure according to the present embodiment. In the downlink, an OFDM access scheme is used.

The following downlink physical channels are used for downlink radio communication from the base station apparatus to the terminal apparatus. Here, the downlink physical channels are used to transmit information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
short/shorter/shortened Physical Downlink Control Channel, PDCCH for sTTI (sPDCCH)
Physical Downlink Shared Channel (PDSCH)
short/shorter/shortened Physical Downlink Shared Channel, PDSCH for sTTI (sPDSCH)
Physical Multicast Channel (PMCH)

The following downlink physical signals are used in the downlink radio communication. Here, the downlink physical signals are not used to transmit information output from the higher layers but are used by the physical layer.

Primary Synchronization Signal (PSS)
Secondary Synchronization Signal (SSS)
Downlink Reference Signal (DL RS)
Discovery Signal (DS)

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference signal (MBSFN RS)
Positioning Reference Signal (PRS)

A downlink radio frame includes a downlink resource block (RB) pair. This downlink RB pair is a unit for allocation of a downlink radio resource and the like and is based on the frequency band of a predefined width (RB bandwidth) and a time duration (two slots=1 subframe). Each of the downlink RB pairs includes two downlink RBs (RB bandwidth*slot) that are contiguous in the time domain. Each of the downlink RBs includes 12 subcarriers in the frequency domain. In the time domain, the downlink RB includes seven OFDM symbols in a case that NCP is added, while the downlink RB includes six OFDM symbols in a case that ECP having a CP length that is longer than NCP is added. A region defined by a single subcarrier in the frequency domain and a single OFDM symbol in the time domain is referred to as a resource element (RE). The PDCCH/EPDCCH is a physical channel in which downlink control information (DCI) such as a terminal apparatus identifier (UEID, a Radio Network Temporary Identifier (RNTI)), PDSCH scheduling information, Physical Uplink Shared Channel (PUSCH) scheduling information, a modulation scheme, a coding rate, and a retransmission parameter is transmitted. Note that although a downlink subframe in a single Component Carrier (CC) is described here, a downlink subframe is defined for each CC and downlink subframes are approximately synchronized between the CCs. Here, being approximately synchronized between the CCs means that the error in the transmission timing of each CC falls within a prescribed range in a case of transmitting by using multiple CCs from the base station apparatus.

Note that, although not illustrated, the SS, the PBCH, and the DLRS may be mapped in the downlink subframe. The DLRS includes a CRS transmitted on the same antenna port (transmission port) as the PDCCH, a CSI-RS used for measurement of channel state information (CSI), a UERS transmitted on the same antenna port as some PDSCHs, and a DMRS transmitted on the same transmission port as the EPDCCH. Carriers on which no CRS is mapped may be used. In this case, a similar signal (referred to as enhanced synchronization signal) to a signal corresponding to one or some antenna ports (for example, only antenna port 0) or all the antenna ports for the CRSs can be inserted into one or some subframes (for example, the first and sixth subframes in the radio frame) as time and/or frequency tracking signals. Here, the antenna port may be referred to as a transmission port. Here, a "physical channel/physical signal transmitted at an antenna port" includes the meaning that a physical channel/physical signal is transmitted by using a radio resource or layer corresponding to the antenna port. For example, the receiver is configured to receive a physical channel or a physical signal from a radio resource or layer corresponding to the antenna port.

Figure 6:
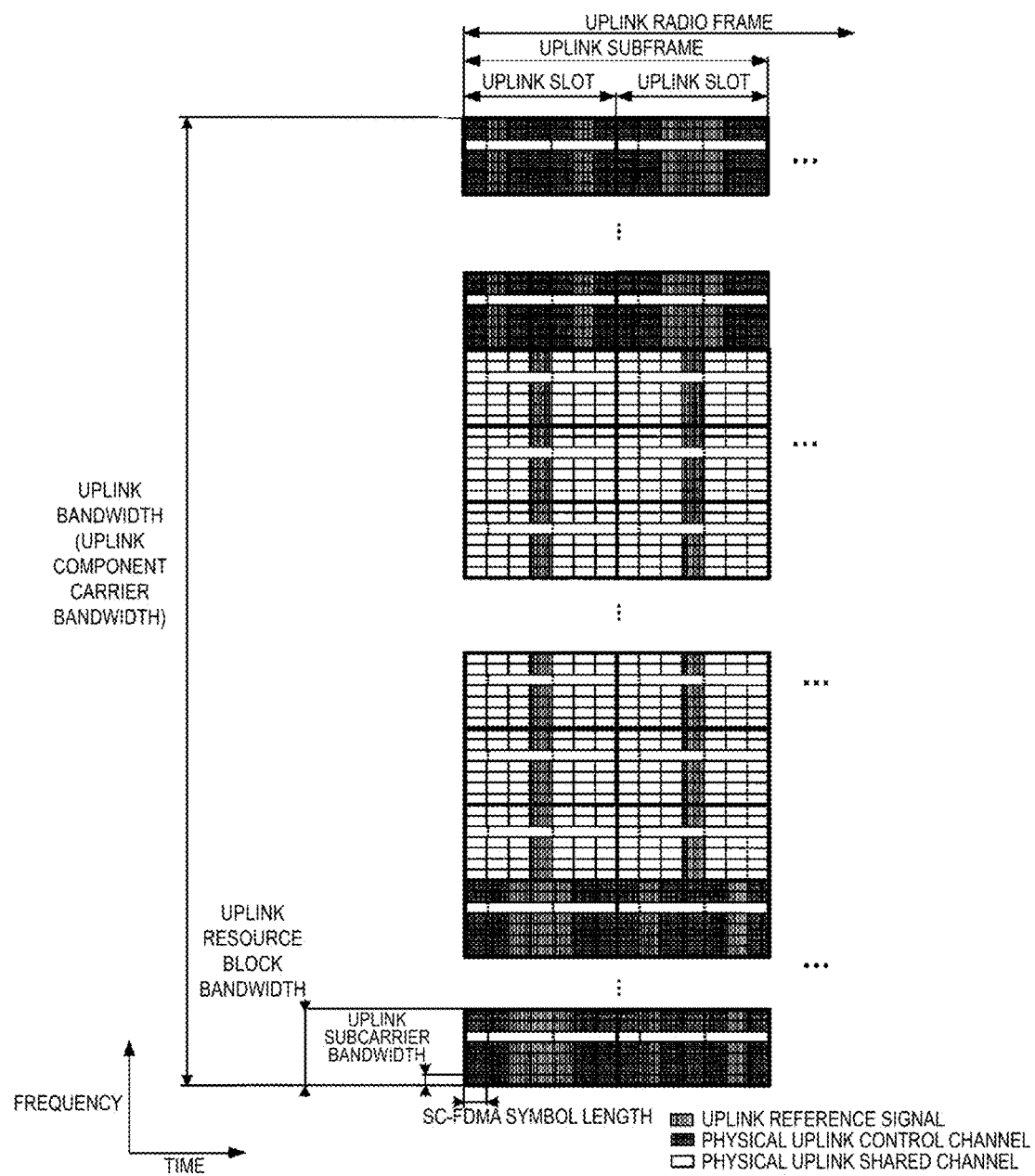
FIG. 6 is a diagram illustrating an example of an uplink radio frame structure according to the first embodiment.

FIG. 6 is a diagram illustrating an example of an uplink radio frame structure according to the present embodiment. An SC-FDMA scheme is used in an LTE cell, and an SC-FDMA scheme or an OFDM scheme is used in an NR cell for the uplink.

In uplink radio communication from the terminal apparatus to the base station apparatus, the following uplink physical channels are used. Here, the uplink physical channels are used to transmit information output from the higher layers.

Physical Uplink Control Channel (PUCCH)
short/shorter/shortened Physical Uplink Control Channel, PUCCH for short TTI (sPUCCH)

Physical Uplink Shared Channel (PUSCH)

short/shorter/shortened Physical Uplink Shared Channel, PUSCH for short TTI (sPUSCH)

Physical Random Access Channel (PRACH)

short/shorter/shortened Physical Random Access Channel, PRACH for short TTI (sPRACH)

The following uplink physical signal is used for uplink radio communication. Here, the uplink physical signal is not used to transmit information output from the higher layers but is used by the physical layer.

Uplink Reference Signal (UL RS)

According to the present embodiment, the following two types of uplink reference signals are used.

Demodulation Reference Signal (DMRS)

Sounding Reference Signal (SRS)

In the uplink, the Physical Uplink Shared Channel (PUSCH), Physical Uplink Control Channel (PUCCH), and the like are allocated. An Uplink Reference Signal (ULRS) is also allocated along with the PUSCH and the PUCCH. An uplink radio frame includes uplink RB pairs. This uplink RB pair is a unit for allocation of uplink radio resources and the like and includes the frequency domain of a predefined width (RB bandwidth) and a predetermined time domain (two slots=1 subframe). Each of the uplink RB pairs includes two uplink RBs (RB bandwidth*slot) that are contiguous in the time domain. Each of the uplink RB includes 12 subcarriers in the frequency domain. In the time domain, the uplink RB includes seven SC-FDMA symbols in a case that NCP is added, while the uplink RB includes six SC-FDMA symbols in a case that ECP is added. Note that although an uplink subframe in a single CC is described here, an uplink subframe may be defined for each CC.

FIG. 5 and FIG. 6 illustrate examples in which different physical channel/physical signals are performed frequency division multiplexing (FDM) and/or time division multiplexing (TDM).

Note that, in a case that various physical channels and/or physical signals are transmitted for the sTTI (short/shorter/shortened Transmission Time Interval), each physical channel and/or physical signal may be referred to as the sPDSCH, the sPDCCH, the sPUSCH, the sPUCCH, and the sPRACH, respectively.

In a case that a physical channel is transmitted for the sTTI, the number of OFDM symbols and/or SC-FDMA symbols constituting the physical channel may use the number of symbols equal to or less than 14 symbols in the NCP (12 symbols in the ECP). The number of symbols used in the physical channel for the sTTI may be configured by using the DCI and/or the DCI format, or may be configured by using higher layer signaling. Not only the number of symbols used in the sTTI, but the start symbol in the time direction may also be configured.

The sTTI may be transmitted within a particular bandwidth within the system bandwidth. The bandwidth configured as the sTTI may be configured by using the DCI and/or the DCI format, or may be configured by using higher layer signaling (RRC signaling, MAC CE). The bandwidth may be configured by using the start and end resource block indexes or frequency positions, or may be configured by using a bandwidth and the start resource block index/frequency position. The bandwidth to which the sTTI is mapped may be referred to as an sTTI band. The physical channels mapped in the sTTI band may be referred to as a physical channel for the sTTI. The physical channel for the sTTI may include the sPDSCH, the sPDCCH, the sPUSCH, the sPUCCH, and the sPRACH.

In a case that the information/parameters used to define the sTTI are configured by using the DCI and/or the DCI format, the DCI and/or the DCI format may be scrambled by using a specific RNTI, or the CRC scrambled with a specific RNTI may be added to a bit sequence constituting the DCI format.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are collectively referred to as physical signals.

The PBCH is used for broadcasting a Master Information Block (MIB, Broadcast Channel (BCH)), which are commonly used by the terminal apparatuses.

The PCFICH is used for transmission of information for indicating a region (OFDM symbols) to be used for transmission of the PDCCH.

The PHICH is used for transmission of an HARQ indicator (HARQ feedback or response information) for indicating an ACKnowledgement (ACK) or a Negative ACKnowledgement (NACK) for the uplink data (Uplink Shared Channel (UL-SCH)) received by the base station apparatus.

The PDCCH, the EPDCCH and/or the sPDCCH are used for transmitting downlink control information (DCI). According to the present embodiment, the PDCCH may include the EPDCCH. The PDCCH may also include the sPDCCH.

Here, multiple DCI formats may be defined in accordance with the application or the configuration of the DCI for the DCI transmitted on the PDCCH, the EPDCCH, and/or the sPDCCH. To be more specific, a field for the DCI may be defined in a DCI format and may be mapped to information bits.

Here, the DCI format for the downlink is also referred to as the DCI of the downlink, a downlink grant (DL grant), and/or a downlink scheduling grant, and/or a downlink assignment. The DCI format for the uplink is also referred to as the DCI of the uplink, an uplink grant (UL grant), and/or an uplink scheduling grant, and/or an uplink assignment.

For example, as a downlink assignment, DCI formats (for example, DCI format 1, DCI format 1A, and/or DCI format 1C, and/or DCI format 2) to be used for the scheduling of one PDSCH in one cell may be defined.

As an uplink grant, DCI formats (for example, DCI format 0, and/or DCI format 4) to be used for the scheduling of one PUSCH in one cell may be defined.

DCI formats (for example, DCI format 3, and/or DCI format 3A, and/or DCI format 3B) to be used to control (adjust) the transmit power of the PUSCH, the PUCCH, or the SRS may be defined for one or multiple terminal apparatuses.

The terminal apparatus may monitor a set of PDCCH candidates, EPDCCH candidates, and/or sPDCCH candidates. Hereinafter, the PDCCH may include the EPDDCH and/or the sPDCCH.

Here, the PDCCH candidates may indicate candidates which the PDCCH may be mapped to and/or transmitted on by the base station apparatus. To monitor may include meaning that the terminal apparatus attempts to decode each PDCCH in the set of PDCCH candidates, in accordance with each of all the monitored DCI formats.

Here, the set of PDCCH candidates to be monitored by the terminal apparatus is also referred to as a search space. The search space may include a Common Search Space (CSS). For example, the CSS may be defined as a space common to multiple terminal apparatuses.

The search space may include a UE-specific Search Space (USS). For example, the USS may be given at least based on the Cell-Radio Network Temporary Identifier (C-RNTI) allocated to the terminal apparatus. The terminal apparatus may monitor the PDCCHs in the CSS and/or USS to detect a PDCCH destined for the terminal apparatus itself.

The search space may be defined with the number of PDCCH candidates in the search space depending on the CSS or USS (in other words, search space type), aggregation level, and search space size. Monitoring (detecting and receiving) the PDCCH in which search space may be based on a value of the CSS or USS, aggregation level, the value of the RNTI (for example, C-RNTI), and the value of the CI corresponding to the SCell in a case that cross carrier scheduling is configured.

Here, a DCI format mapped to the CSS and a DCI format mapped to the USS may be defined as the DCI format.

For the transmission (transmission in the PDCCH) of the DCI, the RNTI which the base station apparatus has allocated to the terminal apparatus may be used. Specifically, Cyclic Redundancy Check (CRC) parity bits are added to a DCI format (or DCI), and after the addition, the CRC parity bits may be scrambled with an RNTI. Here, the CRC parity bits added to the DCI format may be obtained from a payload of the DCI format.

Here, in the present embodiment, "CRC parity bits", "CRC bits", and "CRC" may include the same meaning. The "PDCCH on which the DCI format to which the CRC parity bits are added is transmitted", the "PDCCH including the CRC parity bits and including the DCI format", the "PDCCH including the CRC parity bits", and the "PDCCH including the DCI format" may include the same meaning. The "PDCCH including X" and the "PDCCH with X" may include the same meaning. The terminal apparatus may monitor the DCI format. The terminal apparatus may monitor the DCI. The terminal apparatus may monitor the PDCCH.

The terminal apparatus attempts to decode the DCI format to which the CRC parity bits scrambled with the RNTI are added, and detects, as a DCI format destined for the terminal apparatus itself, the DCI format for which the CRC has been successful (also referred to as blind coding). To be more specific, the terminal apparatus may detect the PDCCH with the CRC scrambled with the RNTI. The terminal apparatus may detect the PDCCH including the DCI format to which the CRC parity bits scrambled with the RNTI are added.

Here, the RNTI may include a C-RNTI. For example, the C-RNTI may be an identifier unique to the terminal apparatus and used for the identification in RRC connection and scheduling. The C-RNTI may be used for dynamically scheduled unicast transmission.

The RNTI may further include a Semi-Persistent Scheduling C-RNTI (SPS C-RNTI). For example, the SPS C-RNTI is an identifier unique to the terminal apparatus and used for Semi-Persistent Scheduling. The SPS C-RNTI may be used for semi-persistently scheduled unicast transmission. Here, the semi-persistently scheduled transmission may include meaning of periodically scheduled transmission.

The RNTI may include a Random Access RNTI (RA-RNTI). For example, the RA-RNTI may be an identifier used for transmission of a random access response message. To be more specific, the RA-RNTI may be used for the transmission of the random access response message in a random access procedure. For example, the terminal apparatus may monitor the PDCCH with the CRC scrambled with the RA-RNTI after the transmission of a random access preamble. The terminal apparatus may receive a random access response on the PDSCH, based on detection of the PDCCH with the CRC scrambled with the RA-RNTI.

Here, the PDCCH with the CRC scrambled with the C-RNTI may be transmitted in the USS or CSS. The PDCCH with the CRC scrambled with the SPS C-RNTI may be transmitted in the USS or CSS. The PDCCH with the CRC scrambled with the RA-RNTI may be mapped only to the CSS.

Examples of the RNTI for scrambling CRC include RA-RNTI, C-RNTI, SPS C-RNTI, temporary C-RNTI (TC-RNTI), eIMTA-RNTI, TPC-PUCCH-RNTI, TPC-PUSCH-RNTI, srs-TPC-RNTI-r14, M-RNTI, P-RNTI, and SI-RNTI.

The PDCCH with the CRC scrambled by either RA-RNTI, C-RNTI, SPS C-RNTI, TC-RNTI, eIMTA-RNTI, TPC-PUCCH-RNTI, TPC-PUSCH-RNTI, srs-TPC-RNTI-r14, M-RNTI, P-RNTI, or SI-RNTI may be mapped to the CSS or the USS by the C-RNTI.

The RA-RNTI, C-RNTI, SPS C-RNTI, eIMTA-RNTI, TPC-PUCCH-RNTI, TPC-PUSCH-RNTI, and srs-TPC-RNTI-r14 are configured from the base station apparatus to the terminal apparatus via higher layer signaling.

The M-RNTI, the P-RNTI, and the SI-RNTI correspond to one value. Here, the P-RNTI corresponds to the PCH and the PCCH, and is used to notify changes in paging and system information. The SI-RNTI corresponds to the DL-SCH and the BCCH, and is used to broadcast system information. The RA-RNTI corresponds to the DL-SCH, and is used for a random access response.

The RA-RNTI, C-RNTI, SPS C-RNTI, TC-RNTI, eIMTA-RNTI, TPC-PUCCH-RNTI, TPC-PUSCH-RNTI, and srs-TPC-RNTI-r14 are configured by using higher layer signaling.

The M-RNTI, the P-RNTI, and the SI-RNTI have prescribed values defined.

The PDCCH with the CRC scrambled with each RNTI may have different transport channels or logical channels depending on the value of the RNTI (for example, C-RNTI). In other words, depending on the value of the RNTI, the information indicated may be different.

One SI-RNTI is used to address SIB 1 as with all SI messages.

DCI format 0 may be transmitted through the PDCCH with the CRC scrambled by the TC-RNTI or the C-RNTI. DCI format 0 may be mapped to the CSS and/or the USS.

DCI format 1A may be transmitted through the PDCCH with the CRC scrambled by the TC-RNTI, the C-RNTI, the SPS C-RNTI, or the RA-RNTI. DCI format 1A may be mapped to the CSS and/or the USS.

DCI format 2 may be transmitted through the PDCCH with the CRC scrambled by the C-RNTI. DCI format 2 may be mapped to the CSS.

DCI format 3 and/or DCI format 3A may be transmitted through the PDCCH with the CRC scrambled with the TPC-PUCCH-RNTI or the TPC-PUSCH-RNTI. DCI format 3 and/or DCI format 3A may be mapped to the CSS.

DCI format 3B may be transmitted through the PDCCH with the CRC scrambled by the srs-TPC-RNTI-r14. DCI format 3B may be mapped to the CSS.

DCI format 4 may be transmitted through the PDCCH with the CRC scrambled by the C-RNTI. DCI format 4 may be mapped to the USS.

In a case that a resource of the PDSCH is scheduled by using a downlink assignment, the terminal apparatus may receive downlink data (DL-SCH, DL transport block) in the PDSCH, based on scheduling. In a case that a resource of the PUSCH is scheduled by using an uplink grant, the terminal apparatus may transmit uplink data (UL-SCH, UL transport block) and/or uplink control information (UCI) by using the PUSCH, based on scheduling. In a case that a resource of the sPUSCH is scheduled by using an uplink grant, the terminal apparatus may transmit uplink data and/or UCI in the sPUSCH, based on scheduling.

DCI format may include at least one or multiple pieces of information or fields (information fields) among the following (B1) to (B19). Some pieces of information may be included in one field. (B1) Carrier Indicator (CI) (B2) switching flag of uplink DCI format and downlink DCI format (B3) frequency hopping flag (B4) resource block assignment and hopping resource allocation for the PUSCH (B5) local or dispersed Virtual Resource Block (VRB) assignment flag for the PDSCH (B6) resource block assignment for the PDSCH (B7) Modulation and coding scheme (MCS) (B8) Redundancy Version (RV) (B9) New Data Indicator (NDI) (B10) HARQ process number (HPN) (B11) Transmission Power Control (TPC) command for the PUSCH (B12) Transmission Power Control (TPC) command for the PUCCH (B13) UL index (B14) Downlink Assignment Index (DAI) (B15) SRS request (B16) CSI request (B17) resource allocation type (B18) HARQ-ACK Resource Offset (ARO) (B19) SRS timing offset (B1) is used to indicate the CC to which the PUSCH or PDSCH is scheduled.

(B2) is used to indicate whether the detected DCI format is an uplink DCI format (for example, DCI format 0) or a downlink DCI format (for example, DCI format 1A).

(B3) and (B4) and (B18) are used to indicate resource allocation for the PUSCH. The number of bits required for the field of (B4) may be determined based on the maximum transmission bandwidth of the uplink CC.

(B5) and (B6) are used to indicate resource allocation of the PDSCH. The number of bits required for the field of (B5) may be determined based on the maximum transmission bandwidth of the downlink CC.

(B7) is used to indicate the MCS of the PUSCH or PDSCH.

(B9) is used to indicate whether the transmission of the scheduled PUSCH or PDSCH (transport block) is new transmission or retransmission.

(B10) is used to indicate the corresponding HARQ process number (ID). The HARQ process is managed with IDs allocated to perform a series of processing in parallel from PDSCH transmission including a transport block to transmission of a corresponding HARQ-ACK, and retransmission of the PDSCH including the transport block in the case of NACK. The number of bits required for the field of (B10) may be determined at least in accordance with the duplex mode of the primary cell and/or whether the FS is FDD or TDD.

(B11) is used to adjust the transmit power of the PUSCH.
(B12) is used to adjust the transmit power of the PUCCH.
(B15) is used to request transmission of SRS.
(B16) is used to request transmission of CSI (CSI report).

The PDSCH is used to transmit downlink data (Downlink Shared Channel (DL-SCH)). The PDSCH is used to transmit a system information message. Here, the system information message may be cell-specific information. The system information may be included in RRC signaling. The PDSCH may also be used to transmit the RRC signaling and the MAC control element.

The PMCH is used to transmit multicast data (Multicast Channel (MCH)).

The synchronization signal is used for the terminal apparatus to establish synchronization in the frequency domain and the time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus to perform channel compensation on a downlink physical channel Here, the downlink reference signal is used for the terminal apparatus to calculate downlink channel state information.

The DS is used for time frequency synchronization, cell identification, Radio Resource Management (RRM) measurement (intra and/or inter frequency measurement) at a frequency at which a parameter related to the DS is configured. The DS includes multiple signals, and the signals are transmitted at the same cycle. The DS may be configured by using resources of the PSS/SSS/CRS, and may be configured by using the CSI-RS resource. In the DS, a Reference Signal Received Power (RSRP) or a Reference Signal Received Quality (RSRQ) may be measured by using the resource to which the CRS or the CSI-RS are mapped. The terminal apparatus may detect the cell ID by detecting the PSS and the SSS.

The BCH, the MCH, the UL-SCH, and the DL-SCH are transport channels Channels used in the medium access control (MAC) layer are referred to as transport channels. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The PUCCH and/or the sPUCCH are used for transmitting (or feedback) uplink control information (UCI). Hereinafter, the PUCCH may include the sPUCCH. Here, the UCI may include channel state information (CSI) used to indicate a downlink channel state. The UCI may include scheduling request (SR) used to request an UL-SCH resource. The UCI may include a Hybrid Automatic Repeat request ACKnowledgement (HARQ-ACK).

Here, the HARQ-ACK may indicate a HARQ-ACK for downlink data (Transport block, Medium Access Control Protocol Data Unit (MAC PDU), Downlink-Shared Channel (DL-SCH), or Physical Downlink Shared Channel (PDSCH)). In other words, the HARQ-ACK may indicate Acknowledgement, positive-acknowledgment (ACK), or Negative-acknowledgement (NACK) for downlink data. In other words, the HARQ may be used to indicate successful or unsuccessful detection and/or demodulation or decoding of the downlink data. The CSI may include a channel quality indicator (CQI), a precoding matrix indicator (PMI), and/or a rank indication (RI). The HARQ-ACK may be referred to as an HARQ-ACK response.

The PUCCH may be defined in a format depending on the type or combination of UCI transmitted on the PUCCH and the payload size of the UCI.

PUCCH format 1 is used to transmit a positive SR.

PUCCH format 1a is used to transmit 1-bit HARQ-ACK, or 1-bit HARQ-ACK with a positive SR, in the case of FDD or FDD-TDD primary cell FS1. Note that the FDD-TDD primary cell FS indicates the FS of the primary cell in the case of FDD-TDD CA. In other words, the FDD-TDD primary cell FS can be referred to as a primary cell of a certain FS in FDD-TDD CA. Secondary cells can also be indicated as well.

PUCCH format 1b is used to transmit 2-bit HARQ-ACK, or 2-bit HARQ-ACK with a positive SR.

PUCCH format 1b may be used to transmit 4-bit HARQ-ACK by using channel selection in a case that more than one serving cells are configured to the terminal apparatus, or in a case that one serving cell is configured to the terminal apparatus in the case of TDD.

The channel selection can change its interpretation, even with the same bit value, by selecting any one of multiple PUCCH resources. For example, the first PUCCH resource and the second PUCCH resource may have different contents indicated even with the same bit value. The channel selection can allow the HARQ-ACK to extend by using multiple PUCCH resources.

PUCCH format 2 is used to transmit a CSI report in a case of not multiplexing HARQ-ACK.

PUCCH format 2 may be used to transmit a CSI report which multiplexes HARQ-ACK for the ECP.

PUCCH format 2a is used to transmit a CSI report which multiplexes 1-bit HARQ-ACK for the NCP.

PUCCH format 2b is used to transmit a CSI report which multiplexes 2-bit HARQ-ACK for the NCP.

In PUCCH format 2a/2b in which only the NCP is supported, a bit certain sequence is mapped to one modulation symbol used to generate the DMRS for the PUCCH. In other words, in PUCCH format 2a/2b in which only the NCP is supported, the DMRS symbol can be used as a symbol to which data can be allocated.

PUCCH format 3 is used to transmit a 10-bit HARQ-ACK for FDD or the FDD-TDD primary cell FS1, 20-bits HARQ-ACK for TDD, and 21-bits HARQ-ACK for the FDD-TDD primary cell FS2.

Here, in the present embodiment, processing for FDD may include processing for FDD CA. Processing for TDD may include processing for TDD CA. Processing for FDD-TDD may include processing for FDD-TDD CA.

PUCCH format 3 may be used to transmit up to 11-bit UCI corresponding to 10-bit HARQ-ACK for FDD or FDD-TDD and 1-bit positive/negative SR, 21-bit UCI corresponding to 20-bit HARQ-ACK for TDD and 1-bit positive/negative SR, and 22-bit UCI corresponding to up to 21-bit HARQ-ACK for the FDD-TDD primary cell FS2 and 1-bit positive/negative SR.

PUCCH format 3 may be used to transmit up to 11-bit UCI corresponding to 10-bit HARQ-ACK for FDD or FDD-TDD and 1-bit positive/negative SR, 21-bit UCI corresponding to 20-bit HARQ-ACK for TDD and 1-bit positive/negative SR, and 22-bit UCI corresponding to up to 21-bit HARQ-ACK for the FDD-TDD primary cell FS2 and 1-bit positive/negative SR.

PUCCH format 3 may be used to transmit HARQ-ACK, 1-bit positive/negative SR (if any), and a CSI report.

PUCCH format 4 is used to transmit UCI with more than 22 bits including HARQ-ACK, SR (if any), and a periodic CSI report (if any).

PUCCH format 4 may be used to transmit more than one CSI reports and SR (if any).

PUCCH format 5 is used to transmit UCI with more than 22 bits including HARQ-ACK, SR (if any), and a periodic CSI report (if any).

PUCCH format 5 may be used to transmit more than one CSI reports and SR (if any).

The number and the allocation of the corresponding DMRSs may be different based on the PUCCH format. For example, in a case that NCP is added, three DMRSs are mapped in one slot for PUCCH format 1/1a/1b, two DMRSs are mapped in one slot for PUCCH format 2/2a/2b/3, and one DMRS is mapped in one slot for PUCCH format 4/5.

In a case that the PUCCH is transmitted in an SRS subframe, in a PUCCH format (for example, format 1, 1a, 1b, 3) to which a shortened format is applied, the PUCCH may be transmitted such that the last one symbol or two symbols (the last one symbol or two symbols of the second slot in the subframe) to which the SRS may be allocated may be emptied, that is, in a shortened format.

PUCCH format 1/1a/1b and PUCCH format 2/2a/2b may be transmitted in the same RB. The cyclic shift for PUCCH format 1/1a/1b in the RBs used for transmission of PUCCH format 1/1a/1b and PUCCH format 2/2a/2b may be individually configured.

The PUSCH and/or the sPUSCH are used for transmission of uplink data (Uplink-Shared Channel (UL-SCH)). Hereinafter, the PUSCH may include the sPUSCH. The PUSCH may be used to transmit a HARQ-ACK and/or CSI along with the uplink data. The PUSCH may be used to transmit CSI only or a HARQ-ACK and CSI only. In other words, the PUSCH may be used to transmit the UCI only.

Here, the base station apparatus and the terminal apparatus may exchange (transmit and/or receive) signals in the higher layers. For example, the base station apparatus and the terminal apparatus may transmit and/or receive RRC signaling (also referred to as an RRC message, RRC information) in the Radio Resource Control (RRC) layer. The base station apparatus and the terminal apparatus may exchange (transmit and/or receive) a Medium Access Control (MAC) control element in the Medium Access Control (MAC) layer. Here, the RRC signaling and/or the MAC control element is also referred to as higher layer signaling.

Here, in the present embodiment, the "higher layer parameter", "higher layer message", "higher layer signaling", "higher layer information", and "higher layer information element" may be the same.

The PUSCH may also be used to transmit the RRC signaling and the MAC control element (MAC CE). Here, the RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). To be more specific, user equipment-specific information may be transmitted through signaling dedicated to a certain terminal apparatus.

The PRACH and/or the sPRACH are used to transmit a random access preamble. Hereinafter, the PRACH may include the sPRACH. For example, the PRACH (or a random access procedure) is used primarily for the terminal apparatus to synchronize the time domain with the base station apparatus. The PRACH (or a random access procedure) may be used for the initial connection establishment procedure, the handover procedure, the connection re-establishment procedure, synchronization (timing adjustment) for uplink transmission, and transmission of a scheduling request (request for a PUSCH resource, request for a UL-SCH resource).

The DMRS is associated with transmission of the PUSCH, the sPUSCH, and/or the PUCCH. To be more specific, the DMRS may be time-multiplexed with the PUSCH, the sPUSCH, or the PUCCH. For example, the base station apparatus may use the DMRS in order to perform channel compensation of the PUSCH, the sPUSCH, or the PUCCH. Depending on the type of physical channel to be demodulated, the DMRS may have a different time multiplexing allocation or a number of multiplexing DMRSs.

The SRS is not associated with the transmission of the PUSCH or the PUCCH. For example, the base station apparatus may use an SRS to measure a channel state of the uplink or transmission timing. The SRS includes a trigger type 0SRS transmitted in a case that a parameter associated with a higher layer signal is configured, and a trigger type 1SRS in which a parameter related to a higher layer signal is configured, which is transmitted in a case that a transmission is requested by an SRS request included in an uplink grant.

The time unit $T_s$ of LTE is based on subcarrier spacing (for example, 15 kHz) and FFT size (for example, 2048). In other words, $T_s$ is 1/(15000*2048) seconds. The time length of one slot is 15360*$T_s$ (in other words, 0.5 ms). The time length of one subframe is 30720*$T_s$ (in other words, 1 ms). The time length of one radio frame is 307200*$T_s$ (in other words, 10 ms).

Scheduling of a physical channel or a physical signal is managed by using a radio frame. The time length of one radio frame is 10 milliseconds (ms). One radio frame includes 10 subframes. Furthermore, one subframe includes two slots. In other words, the time length of one subframe is 1 ms and the time length of one slot is 0.5 ms. Scheduling is managed by using a resource block as a minimum unit of scheduling for allocating a physical channel. The resource block is defined by a given frequency domain including a set of multiple subcarriers (for example, 12 subcarriers) on a frequency axis and a domain including a specific transmission time interval (TTI, slot, symbol). Note that one subframe may be referred to as a one resource block pair.

One TTI may be defined as one subframe or the number of symbols constituting one subframe. For example, in the case of Normal Cyclic Prefix (NCP), one TTI may include 14 symbols. In the case of Extended CP (ECP), one TTI may include 12 symbols. Note that the TTI may be defined as a reception time interval on the receiving side. The TTI may be defined as a unit of transmission or a unit of reception of a physical channel or a physical signal. In other words, the time length of a physical channel or a physical signal may be defined based on the length of the TTI. Note that the symbol may include an SC-FDMA symbol and/or an OFDM symbol. The length of the TTI (TTI length) may be expressed by the number of symbols. The TTI length may be expressed by the time length such as milliseconds (ms) or microseconds (μs).

A sequence according to a physical channel and/or a physical signal is mapped to each symbol. In order to increase the detection accuracy of the sequence, CP is added to a sequence according to the physical channel and/or the physical signal. The CP includes NCP and ECP, and the ECP has a longer sequence length than the NCP. Note that the sequence length according to CP may be referred to as the CP length.

In a case that the terminal apparatus and the base station apparatus support functions related to Latency Reduction (LR), one TTI may be configured with fewer symbols than 14 symbols (12 symbols in the ECP) in the NCP. For example, the TTI length of one TTI may be configured with any number of symbols of 2, 3, or 7. A TTI configured with fewer symbols than 14 symbols (12 symbols in the ECP) in the NCP may be referred to as a sTTI (short TTI, shorter TTI, shortened TTI). A TTI including seven symbols may be referred to as a slot. A TTI including fewer symbols than seven symbols may be referred to as a sub-slot.

A TTI of 14 symbols with the TTI length of NCP (12 symbols in ECP) may simply be referred to as a TTI.

The TTI length of the sTTI (DL-sTTI) for the downlink transmission may be configured to either two symbols or seven symbols. The TTI length of the sTTI (UL-sTTI) for the uplink transmission may be configured to either two symbols, three or four symbols or seven symbols. The sPDCCH and the sPDSCH may be mapped within the DL-sTTI. Note that the TTI lengths of the sPUSCH, the sPUCCH, and the sPRACH may be individually configured. Note that the TTI length of the sPDSCH may include a symbol of the sPDCCH or may include a symbol of the PDCCH. The TTI length of the sPUSCH and/or the sPUCCH may include a symbol of the DMRS or may include a symbol of the SRS.

The subcarrier spacing of the various physical channels and/or physical signals described above may be defined/configured individually for each physical channel and/or physical signal. The time lengths of one symbol of the various physical channels and/or physical signals may be defined/configured individually for each physical channel and/or physical signal. In other words, the TTI lengths of the various physical channels and/or physical signals may be defined/configured individually for each physical channel and/or physical signal.

In an aspect of the present invention, the time domain may be expressed as the time length or the number of symbols. The frequency domain may be expressed by the bandwidth or the number of subcarriers, the number of resource elements in the frequency direction, and the number of resource blocks.

In an LR cell, the size of the TTI may be changed based on the type of subframes, configuration information of a higher layer, and control information included in L1 signaling.

In an LR cell, an access that does not require a grant may be possible. Note that an access that does not require a grant is an access without control information (DCI format, downlink grant, and uplink grant) for indicating a schedule of the PDSCH or the PUSCH (downlink or uplink shared channel/data channel). In other words, in an LR cell, an access scheme that does not perform dynamic resource allocation or transmission indication by using the PDCCH (downlink control channel) may be applied.

In an LR cell, the terminal apparatus may perform the HARQ-ACK and/or CSI feedback corresponding to the downlink resource (signal, channel), based on the functions (performance, capability) of the terminal apparatus and the configuration from the base station apparatus, by using the uplink resources (signals, channels) mapped to the same subframe. Note that in this subframe, a reference resource related to the CSI for a CSI measurement result in a certain subframe may be a CRS or a CSI-RS of the same subframe. Such a subframe may be referred to as a self-contained subframe.

Note that a self-contained subframe may include one or more continuous subframes. In other words, the self-contained subframe may include multiple subframes, or may be one transmission burst including multiple subframes. The last subframe constituting the self-contained subframe (the late subframe including the last tail) is preferably an uplink subframe or a special subframe. In other words, it is preferable that an uplink signal/channel be transmitted in this last subframe.

In a case that the self-contained subframe includes multiple downlink subframes and one uplink subframe or a special subframe, the HARQ-ACK for each of the multiple downlink subframes may be transmitted on the UpPTS of the one uplink subframe or the special subframe.

The communication apparatus determines ACK or NACK for the signal, based on whether or not the signal has been received (demodulated or decoded). The ACK indicates that the signal has been received at the communication apparatus, and the NACK indicates that the signal has not been received at the communication apparatus. The communication apparatus with the feedback of the NACK may retransmit a signal that is NACK. The terminal apparatus determines whether or not to retransmit the PUSCH, based on the contents of the HARQ-ACK for the PUSCH transmitted from the base station apparatus. The base station apparatus determines whether or not to retransmit the PDSCH, based on the contents of the HARQ-ACK for the PDSCH or the PDCCH/EPDCCH transmitted from the terminal apparatus. The ACK/NACK for the PUSCH transmitted by the terminal apparatus is fed back to the terminal apparatus by using the PDCCH or the PHICH. The ACK/NACK for the PDSCH or the PDCCH/EPDCCH transmitted by the base station apparatus is fed back to the base station apparatus by using the PUCCH or the PUSCH.

Note that in an aspect of the present invention, a subframe indicates a unit of transmission and/or a unit of reception of the base station apparatus and/or the terminal apparatus.

The base station apparatus may determine that the terminal apparatus is a Latency Reduction (LR) device, based on a Logical Channel ID (LCID) for a Common Control Channel (CCCH) and capability information (performance information, functional information) of the terminal apparatus.

In a case that the terminal apparatus and/or the base station apparatus supports the capability related to LR, processing time (processing delay, latency) may be determined based on the length (number of symbols) of the TTI used for the received signal and/or the transmitted signal. In other words, the processing time of the terminal apparatus and/or the base station apparatus supporting the capability related to LR may be variable based on the TTI length for the received signal and/or the transmitted signal.

S1 signaling is extended including terminal radio capability information for paging. In a case that this paging specific capability information is provided to the Mobility Management Entity (MME) by the base station apparatus, the MME may use this information to indicate to the base station apparatus that the paging request from the MME is related to the LR terminal. The identifier may be referred to as an ID (Identity, Identifier).

The capability information (UE radio access capability, UE EUTRA capability) of the terminal apparatus initiates a procedure for a terminal apparatus in a connected mode in a case that the base station apparatus (EUTRAN) needs capability information of the terminal apparatus. The base station apparatus queries the capability information of the terminal apparatus. The terminal apparatus transmits the capability information of the terminal apparatus in response to the inquiry. The base station apparatus determines whether or not to correspond to the capability information, and in a case of corresponding, the base station apparatus transmits the configuration information corresponding to the capability information to the terminal apparatus by using higher layer signaling or the like. The terminal apparatus determines that transmission and/or reception based on the capability information is possible, by configuring the configuration information corresponding to the capability information.

The parameters related to the configuration of the physical channels and/or physical signals may be configured as higher layer parameters to the terminal apparatus via higher layer signaling. Parameters related to the configuration of some physical channels and/or physical signals may be configured to the terminal apparatus via L1 signaling (physical layer signaling, for example, the PDCCH/EPDCCH), such as a DCI format or a grant. A default configuration or a default value may be configured in advance to the terminal apparatus for the parameters related to the configuration of the physical channels and/or physical signals. The terminal apparatus may update the default value in a case that a parameter related to the configuration is notified by using higher layer signaling. The type of higher layer signaling/message used to notify the configuration may be different depending on the corresponding configuration. For example, the higher layer signaling/message may include an RRC message, broadcast information, system information, or the like.

In a case that the base station apparatus transmits a DS at the LAA frequency, the base station apparatus may map the data information and/or control information in the DS occasion. The data information and/or control information may include information related to an LAA cell. For example, the data information and/or control information may include a frequency to which the LAA cell belongs, a cell ID, a load or congestion state, interference/transmit power, a channel occupation time, or a buffer state related to transmission data.

In the LAA frequency, in a case that the DS is measured, the resources used for each signal included in the DS may be extended. For example, not only antenna port 0, but also resources corresponding to antenna ports 2, 3, or the like may be used for the CRS. Not only antenna port 15, but also resources corresponding to antenna ports 16, 17, or the like may be used for the CSI-RS.

In the LR cell, the RS for demodulation/decoding and the RS for the CSI measurement may be a common resource, or may be a different resource in a case that the RS is individually defined.

Next, a cell search according to the present embodiment will be described.

In LTE, the cell search is a procedure in which the terminal apparatus performs time frequency synchronization of a certain cell and detects a cell ID of the cell. The EUTRA cell search supports a total transmission bandwidth that is scalable corresponding 72 subcarriers or more. The EUTRA cell search is performed based on the PSS and the SSS in the downlink. The PSS and the SSS are transmitted by using 72 subcarriers in the center of the bandwidth of the first subframe and the sixth subframe of each radio frame. The neighbor cell search is performed based on the same downlink signal as the initial cell search.

In the present embodiment, "an addition of CP to OFDM symbols and/or SC-FDMA symbols" may be synonymous with "an addition of a sequence of CP to a sequence of physical channels transmitted in OFDM symbols and/or SC-FDMA symbols". Note that, in NR, either the OFDM symbol or the SC-FDMA symbol may be determined based on whether the DFT precoding is enabled or disabled.

Next, a procedure relating to the PDSCH according to the present embodiment will be described.

In a case that the higher layer parameter dl-TTI-Length is configured for the terminal apparatus, the PDSCH is received in a slot or a sub-slot. The higher layer parameter dl-TTI-Length may be a parameter used to configure the number of symbols used for the downlink TTI (that is, the number of symbols constituting the slot or the sub-slot).

For the FDD, in a case that the higher layer parameter tdm-Pattern-Single-Tx-r15 is configured for the terminal apparatus, there may be up to 16 downlink HARQ processes for each serving cell. Otherwise, there may be up to 8 HARQ processes for each serving cell.

For the PCell of FDD-TDD and FS1, there may be up to 16 HARQ processes for each serving cell for which the higher layer parameter dl-TTI-Length is configured.

For the PCell of FDD-TDD and FS1, in a case that the higher layer parameter tdm-Pattern-Single-Tx-r15 is configured for the terminal apparatus, there may be up to 16 HARQ processes for each serving cell.

For the PCell of FDD-TDD and FS1, in other cases than the above, there may be up to 8 HARQ processes for each serving cell.

In a case that EN-DC is configured and a single transmission is applied to one or multiple LTE cells (LTE-FDD cells and/or LTE-TDD cells), the terminal apparatus may simultaneously process up to 16 downlink HARQ processes for each serving cell. The maximum number of downlink HARQ processes in such a case may be determined based on the capability supported by the terminal apparatus. In other words, in a case that the EN-DC is configured and single transmission is applied to the LTE cell, information for indicating that up to maximum 16 (or a prescribed number of) downlink HARQ processes are supported for the LTE-FDD cell and/or the LTE-TDD cell may be transmitted to the base station apparatus by the terminal apparatus as the capability information. The base station apparatus may configure the maximum number of downlink HARQ processes, based on the received capability information of the terminal apparatus. The base station apparatus may configure the maximum number of the configured downlink HARQ processes as a higher layer parameter to the terminal apparatus. The base station apparatus may determine the number of bits in the HPN field, based on the maximum number of the configured downlink HARQ processes. Note that the single transmission may include at least one of single channel transmission and/or single cell (single carrier) transmission and/or single RAT transmission.

Next, the number of bits in the HPN field included in DCI format 1A and DCI format 2 according to the present embodiment will be described.

The number of bits in the HPN field may be determined depending on the maximum number of the HARQ processes (downlink HARQ processes) in the serving cell. For example, in a case that the maximum number is 8, the number of bits in the HPN field may be 3 bits, and in a case that the maximum number is 16, then the number of bits in the HPN field may be 4 bits. In a case that the maximum number is greater than a prescribed number or the maximum number is defined according to the UL/DL configuration, the number of bits in the HPN field may be the prescribed number of bits (for example, four bits).

In the case of the FDD primary cell (in other words, in a case that the duplex mode of the primary cell is FDD and/or in a case that the FS of the primary cell is FS1), the number of bits in the HPN field may be four bits in a case that the higher layer parameter dl-TTI-Length is configured.

In the case of the FDD primary cell, and in a case that the higher layer parameter tdm-Pattern-Single-Tx-r15 is configured and the corresponding DCI (the DCI format including the HPN field) is mapped in the USS given by the C-RNTI, the number of bits in the HPN field may be four bits. In other words, in the case of the FDD primary cell and in the case that the higher layer parameter tdm-Pattern-Single-Tx-r15 is configured, regardless of whether the DCI format (in other words, DCI format 1A or DCI format 2) indicates the scheduling of the PDSCH for an FDD cell (or FDD SCell) or indicates the scheduling of the PDSCH for a TDD cell (or TDD SCell), the number of bits in the HPN field may be four bits.

In the case of the FDD primary cell, the number of bits in the HPN field may be given, in a case that the corresponding DCI (the DCI format including the HPN field) is mapped in the USS given by the C-RNTI, based at least on the value of the higher layer parameter tdm-Pattern-Single-Tx-r15. In other words, in the case of the FDD primary cell and in the case that the higher layer parameter tdm-Pattern-Single-Tx-r15 is a prescribed value, regardless of whether the DCI format (in other words, DCI format 1A or DCI format 2) indicates the scheduling of the PDSCH for an FDD cell (or FDD SCell) or indicates the scheduling of the PDSCH for a TDD cell (or TDD SCell), the number of bits in the HPN field may be four bits.

In other words, in a case that the base station apparatus is the FDD primary cell, and in a case that the base station apparatus configures the EN-DC configuration, and in the case that the base station apparatus configures the higher layer parameter tdm-Pattern-Single-Tx-r15, the number of bits in the HPN field may be set to four bits, in a case that the DCI format including the HPN field is mapped to the USS given by the C-RNTI. In a case of the FDD primary cell, and in a case that the EN-DC configuration is configured, and in a case that the higher layer parameter tdm-Pattern-Single-Tx-r15 is configured, the terminal apparatus may decode assuming that the number of bits in the HPN field is set to four bits, in a case that the DCI format including the HPN field is mapped to the USS given by the C-RNTI.

In the case of the FDD primary cell, in addition to the cases described above, the number of bits in the HPN field may be three bits. For example, in a case that the corresponding DCI (the DCI format including the HPN field) is mapped to the CSS, even in a case that the higher layer parameter tdm-Pattern-Single-Tx-r15 is configured, the number of bits in the HPN field may be three bits. In other words, in the case of the FDD primary cell and in the case that the higher layer parameter tdm-Pattern-Single-Tx-r15 is configured, regardless of whether the DCI format (in other words, DCI format 1A or DCI format 2) indicates the scheduling of the PDSCH for an FDD cell (or FDD SCell) or indicates the scheduling of the PDSCH for a TDD cell (or TDD SCell), the number of bits in the HPN field may be three bits, in a case that the DCI format is mapped to the CSS.

In other words, in a case that the base station apparatus is the FDD primary cell, and in a case that the base station apparatus configures the EN-DC configuration, and in the case that the base station apparatus configures the higher layer parameter tdm-Pattern-Single-Tx-r15, the number of bits in the HPN field may be set to three bits, in a case that the DCI format including the HPN field is mapped to the CSS. In a case of the FDD primary cell, and in a case that the EN-DC configuration is configured, and in a case that the higher layer parameter tdm-Pattern-Single-Tx-r15 is configured, the terminal apparatus may decode assuming that the number of bits in the HPN field is set to three bits, in a case that the DCI format including the HPN field is mapped to the CSS.

In the case of the TDD primary cell (in other words, in a case that the duplex mode of the primary cell is TDD and/or in a case that the FS of the primary cell is FS2), the number of bits in the HPN field may be four bits. In other words, regardless of whether or not the higher layer parameter tdm-Pattern-Single-Tx-r15 is configured, and/or regardless of whether the corresponding DCI (the DCI format including the HPN field) is mapped to the CSS or the USS given by the C-RNTI or the TC-RNTI, and/or regardless of whether the DCI format (in other words, DCI format 1A or DCI format 2) indicates the scheduling of the PDSCH for an FDD cell (in other words, a serving cell with the duplex mode of FDD) or indicates the scheduling of the PDSCH for an TDD cell (in other words, a serving cell with the duplex mode of TDD), the number of bits in the HPN field may always be four bits.

For example, in a case that the base station apparatus is the TDD primary cell, and in a case that the base station apparatus configures the EN-DC configuration, and in the case that the base station apparatus configures the higher layer parameter tdm-Pattern-Single-Tx-r15, the number of bits in the HPN field may be set to four bits, in a case that the DCI format including the HPN field is mapped to the CSS or the USS. In a case of the TDD primary cell, and in a case that the EN-DC configuration is configured, and in a case that the higher layer parameter tdm-Pattern-Single-Tx-r15 is configured, the terminal apparatus may decode assuming that the number of bits in the HPN field is set to four bits, in a case that the DCI format including the HPN field is mapped to the USS given by the C-RNTI.

A communicable range (communication area) at each frequency controlled by a base station apparatus is regarded as a cell. At this time, the communication area covered by the base station apparatus may be different in size and shape for each frequency. The covered area may be different for each frequency. A radio network, in which cells having different types of base station apparatuses or different cell radii are located in a mixed manner in the area with the same frequency and/or different frequencies to form a single communication system, is referred to as a heterogeneous network.

The terminal apparatus is in a non-connected state with any network, such as immediately after power is turned on (for example, at the time of activation). Such a non-connected state is referred to as an idle mode (RRC idle). The terminal apparatus in the idle mode needs to be connected to any network in order to perform communication. In other words, the terminal apparatus needs to be in a connected mode (RRC connection). Here, the network may include a base station apparatus belonging to the network, an access point, a network server, a modem, and the like.

The terminal apparatus and the base station apparatus may employ a technique for aggregating the frequencies (component carriers or frequency band) of multiple different frequency bands through CA and treating the resultant as a single frequency (frequency band). A component carrier is categorized as an uplink component carrier corresponding to the uplink (uplink cell) and a downlink component carrier corresponding to the downlink (downlink cell). In each embodiment of the present invention, frequency and frequency band may be used synonymously.

For example, in a case that each of five component carriers having frequency bandwidths of 20 MHz are aggregated through CA, a terminal apparatus capable of performing CA may perform transmission and/or reception by assuming that the aggregated carriers have a frequency bandwidth of 100 MHz. Note that component carriers to be aggregated may have contiguous frequencies or frequencies some or all of which are discontinuous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band. The terminal apparatus and/or the base station apparatus may transmit and/or receive simultaneously by using component carriers (component carriers corresponding to cells) belonging to the operating bands.

It is also possible to aggregate multiple contiguous or discontinuous component carriers of the same frequency bands. The frequency bandwidth of each component carrier may be a narrower frequency bandwidth (for example, 5 MHz or 10 MHz) than the receivable frequency bandwidth (for example, 20 MHz) of the terminal apparatus, and the frequency bandwidths to be aggregated may be different from each other. The terminal apparatus and/or the base station apparatus having NR functionality may support both a cell that has backward compatibility with the LTE cell and a cell that does not have backward compatibility.

The terminal apparatus and/or the base station apparatus having LR functionality may gather multiple component carriers (carrier type, cell) that do not have backward compatibility with LTE. Note that the number of uplink component carriers to be allocated to (configured for or added for) the terminal apparatus by the base station apparatus may be the same as or may be fewer than the number of downlink component carriers.

A cell including an uplink component carrier in which an uplink control channel is configured for a radio resource request and a downlink component carrier having a cell-specific connection with the uplink component carrier is referred to as a PCell. A cell including component carriers other than a PCell is referred to as a SCell. The terminal apparatus receives a paging message, detects update of broadcast information, carries out an initial access procedure, configures security information, and the like in a PCell, and may not perform these operations in a SCell.

Although a PCell is not a target of Activation and Deactivation controls (in other words, considered as being activated at any time), a SCell has activated and deactivated states, the change of which is explicitly specified by the base station apparatus or is made based on a timer configured for the terminal apparatus for each component carrier. The PCell and SCell are collectively referred to as a serving cell.

The terminal apparatus and/or the base station apparatus supporting both LTE cells and LR cells may configure a cell group for the LTE cells and a cell group for the LR cells in a case of communicating by using both the LTE cells and the LR cells. In other words, a cell corresponding to the PCell may be included in each of the cell group for the LTE cells and the cell group for the LR cells.

Note that CA achieves communication by using multiple component carriers (frequency bands) using multiple cells, and is also referred to as cell aggregation. Note that the terminal apparatus may have radio connection (RRC connection) with the base station apparatus via a relay station apparatus (or repeater) for each frequency. In other words, the base station apparatus of the present embodiment may be replaced with a relay station apparatus.

The base station apparatus manages a cell, which corresponds to an area where terminal apparatuses can communicate with the base station apparatus, for each frequency. A single base station apparatus may manage multiple cells. Cells are classified into multiple types of cells depending on the size of the area (cell size) that allows for communication with terminal apparatuses. For example, cells are classified into macro cells and small cells. Moreover, small cells are classified into femto cells, pico cells, and nano cells depending on the size of the area. In a case that a terminal apparatus can communicate with a certain base station apparatus, the cell configured so as to be used for the communication with the terminal apparatus is referred to as a serving cell while the other cells not used for the communication are referred to as neighboring cells, among the cells of the base station apparatus.

In other words, in CA, multiple serving cells thus configured include one PCell and one or multiple SCells.

The PCell is a serving cell in which an initial connection establishment procedure (RRC Connection establishment procedure) has been performed, a serving cell in which a connection re-establishment procedure (RRC Connection reestablishment procedure) has been initiated, or a cell indicated as a PCell in a handover procedure. The PCell operates at a primary frequency. At the point of time in a case that a connection is (re)established, or later, a SCell may be configured. Each SCell operates at a secondary frequency. Note that the connection may be referred to as an RRC connection. For the terminal apparatus supporting CA, a single PCell and one or more SCells may be aggregated.

In a case that more than one serving cells are configured or a secondary cell group is configured, the terminal apparatus retains, for each serving cell, the received soft channel bits corresponding to at least a prescribed range, for at least a prescribed number of transport blocks, in accordance with the decoding failure of the coding blocks of the transport blocks.

The LAA terminal may support functions corresponding to two or more radio access technologies (RATs).

The LAA terminal supports two or more operating bands. In other words, the LAA terminal supports functions related to CA.

The LAA terminal may support Time Division Duplex (TDD) or Half Duplex Frequency Division Duplex (HD-FDD). The LAA terminal may support Full Duplex FDD (FD-FDD). The LAA terminal may indicate which duplex mode/frame structure type is supported via higher layer signaling such as capability information.

The LAA terminal may be an LTE terminal of category X (X is a prescribed value). In other words, the LAA terminal may have an extended maximum number of bits of transport blocks that can be transmitted/received in one TTI. In LTE, one TTI corresponds to one subframe.

Note that in each embodiment of the present invention, a TTI and a subframe may be defined separately.

The LAA terminal may support multiple duplex modes/frame structure types.

Frame structure type 1 can be applied to both FD-FDD and HD-FDD. In FDD, 10 subframes are available for each of the downlink transmission and the uplink transmission at each 10 ms interval. The uplink transmission and the downlink transmission are divided in the frequency domain. In the HD-FDD operation, the terminal apparatus cannot transmit and receive at the same time, but there is no restriction in the FD-FDD operation.

The re-tuning time (time required for tuning (number of subframes or number of symbols)) in a case that the frequency hopping or the frequency of use is changed) may be configured by higher layer signaling.

For example, in the LAA terminal, the number of supported downlink transmission modes (PDSCH transmission modes) may be reduced. In other words, in a case that the number of downlink transmission modes or the downlink transmission mode supported by the LAA terminal is indicated as capability information from the LAA terminal, the base station apparatus configures the downlink transmission mode, based on the capability information. Note that in a case that a parameter for the downlink transmission mode not supported by the LAA terminal is configured, the LAA terminal may ignore the configuration. In other words, the LAA terminal may not necessarily perform processing for the downlink transmission mode not supported. Here, the downlink transmission mode is used to indicate the transmission scheme of the PDSCH corresponding to the PDCCH/EPDCCH, based on the configured downlink transmission mode, the RNTI type, the DCI format, or the search space. Based on these pieces of information, the terminal apparatus can know whether the PDSCH is transmitted at antenna port 0, transmitted in transmission diversity, or transmitted at multiple antenna ports, etc. The terminal apparatus can appropriately perform reception processing, based on these pieces of information. Even in a case that the DCI related to the resource allocation of the PDSCH is detected from the same type of DCI format, in a case that the downlink transmission mode or the RNTI type is different, the PDSCH is not necessarily transmitted in the same transmission scheme.

In a case that the terminal apparatus supports a function related to simultaneous transmission of the PUCCH and the PUSCH, and in a case that the terminal apparatus supports a function related to repeated transmission of the PUSCH and/or repeated transmission of the PUCCH, the PUCCH and the PUSCH may be repeatedly transmitted for a prescribed number of times at the timing in which the PUSCH transmission has occurred or the timing in which the PUCCH transmission has occurred. In other words, simultaneous transmission of the PUCCH and the PUSCH may be performed at the same timing (that is, the same subframe).

In such a case, the PUCCH may include a CSI report, HARQ-ACK, or an SR.

All signals can be transmitted and/or received in the PCell, but some signals may not be transmitted and/or received in the SCell. For example, the PUCCH is transmitted only in the PCell. Unless multiple Timing Advance Groups (TAGs) are configured between the cells, the PRACH is transmitted only in the PCell. The PBCH is transmitted only in the PCell. The MIB is transmitted only in the PCell. However, in a case that the terminal apparatus supports the function of transmitting the PUCCH and/or the MIB in the SCell, the base station apparatus may indicate the terminal apparatus to transmit the PUCCH or the MIB in the SCell (frequency corresponding to the SCell). In other words, in a case that the terminal apparatus supports the function, the base station apparatus may configure a parameter for transmitting the PUCCH or the MIB in the SCell for the terminal apparatus.

In the PCell, Radio Link Failure (RLF) is detected. In the SCell, even in a case that conditions for the detection of RLF are satisfied, the detection of the RLF is not recognized. In a case that the conditions of the RLF are satisfied in a lower layer of the PCell, the lower layer of the PCell notifies a higher layer of the PCell that the conditions of the RLF are satisfied. Semi-Persistent Scheduling (SPS) or Discontinuous Transmission (DRX) may be used in the PCell. In the SCell, the same DRX as the PCell may be performed. Fundamentally, in the SCell, the MAC configuration information/parameters are shared with the PCell of the same call group. Some of the parameters (for example, sTAG-Id) may be configured for each SCell. Some timers or counters may be applied only to the PCell. A timer or counter to be applied may be configured only to the SCell.

Figure 7:
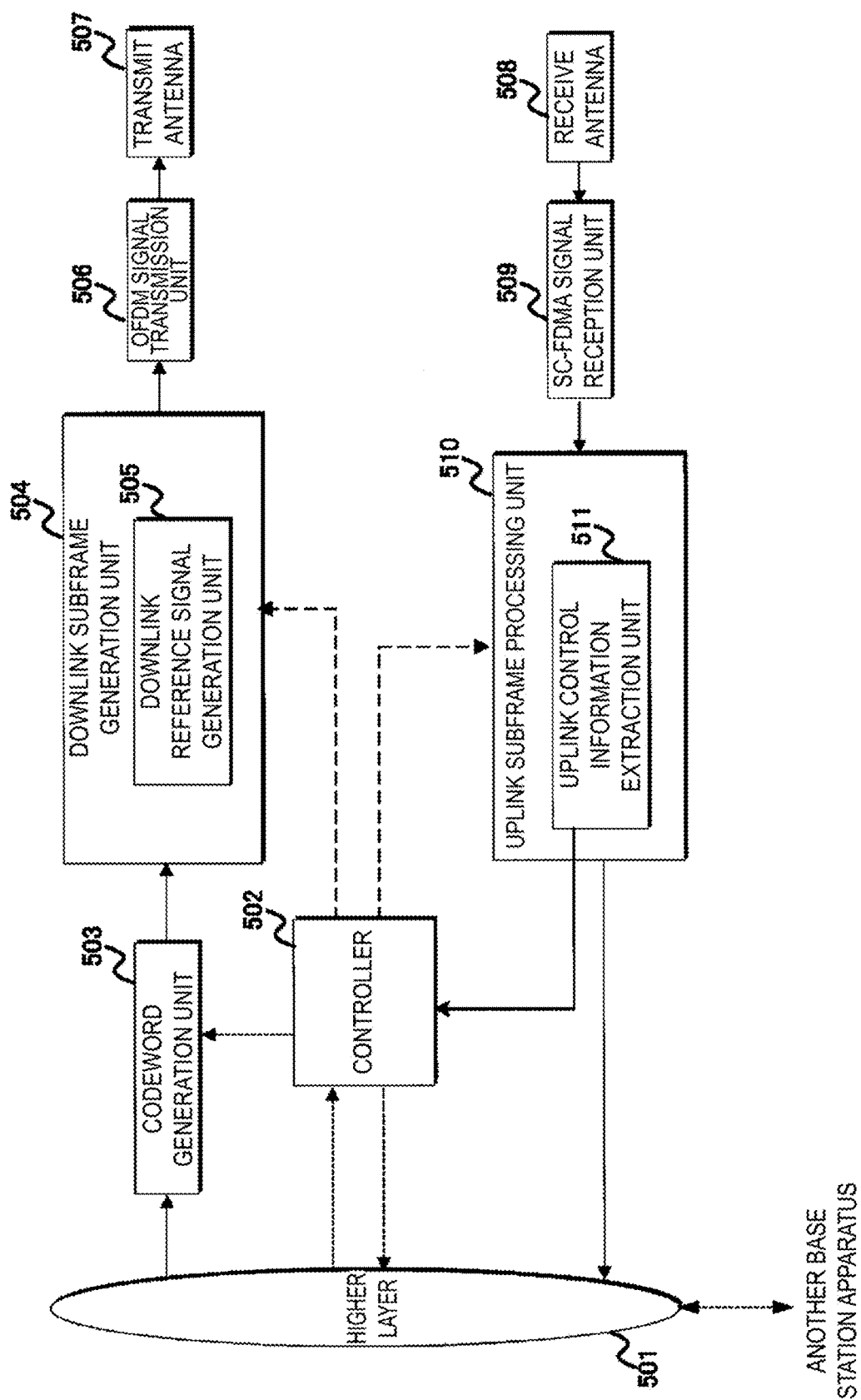
FIG. 7 is a diagram illustrating an example of a block configuration of a base station apparatus according to the first embodiment.

FIG. 7 is a schematic diagram illustrating an example of a block configuration of a base station apparatus 2 (eNB, en-gNB) according to the present embodiment. The base station apparatus 2 includes a higher layer (higher layer control information notification unit) 501, a controller (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (channel state measurement unit and/or CSI reception unit) 509, and an uplink subframe processing unit 510. The downlink subframe generation unit 504 includes a downlink reference signal generation unit 505. The uplink subframe processing unit 510 includes an uplink control information extraction unit (CSI acquisition unit/HARQ-ACK acquisition unit/SR acquisition unit) 511. Note that the SC-FDMA signal reception unit 509 also serves as a measurement unit of received signals, CCA, and interference noise power. Note that the SC-FDMA signal reception unit may be an OFDM signal reception unit, or may include an OFDM signal reception unit, in a case that the terminal apparatus supports transmission of OFDM signals. Note that the downlink subframe generation unit may be a downlink TTI generation unit or may include a downlink TTI generation unit. The downlink TTI generation unit may a generation unit for a physical channel and/or a physical signal constituting the downlink TTI. Note that the same may go for the uplink. Note that, although not illustrated, the base station apparatus may include a transmitter configured to transmit a TA command. The base station apparatus may include a receiver configured to receive measurement results related to a time difference between reception and transmission reported from the terminal apparatus.

Figure 8:
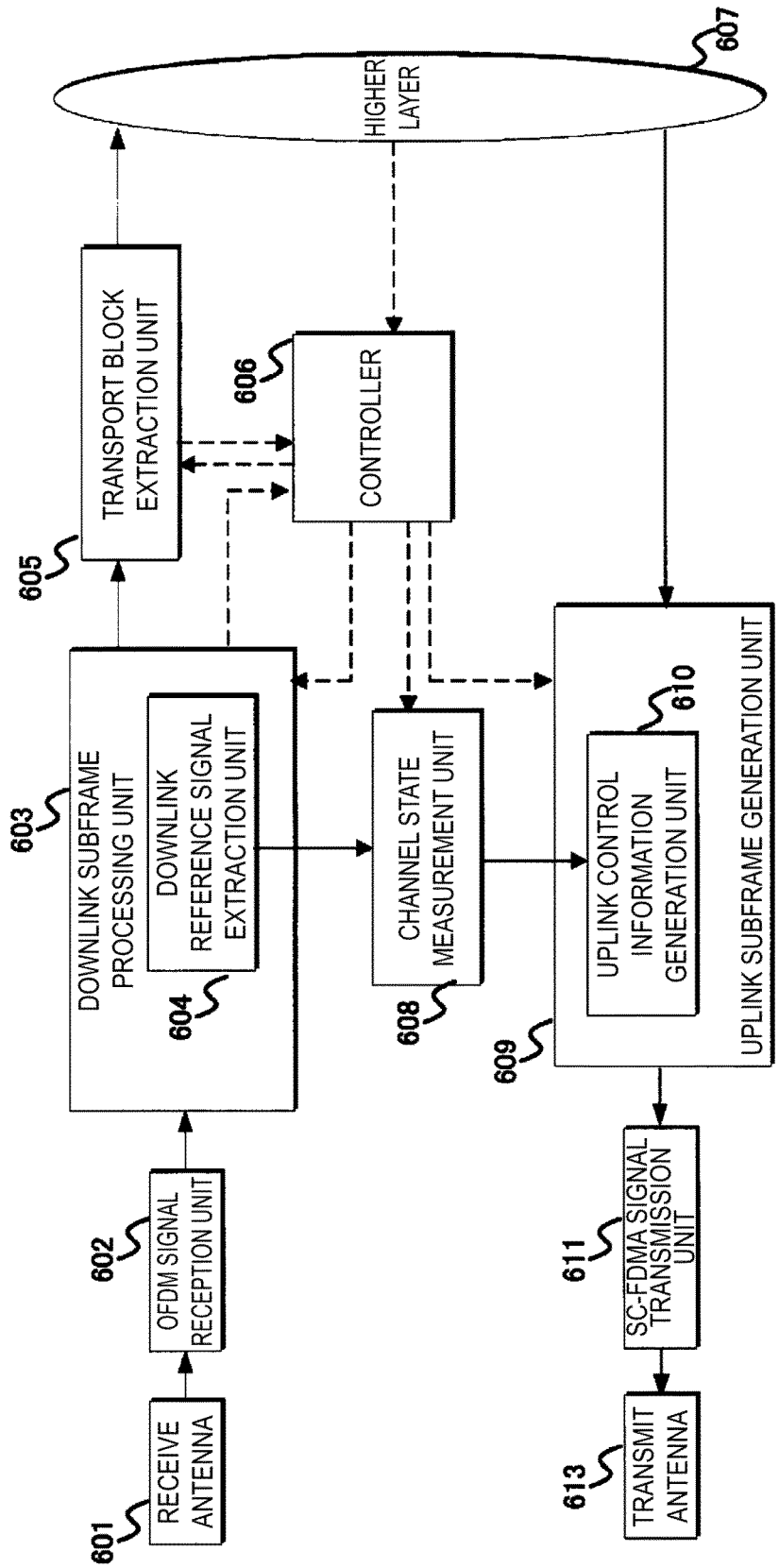
FIG. 8 is a diagram illustrating an example of a block configuration of a terminal apparatus according to the first embodiment.

FIG. 8 is a schematic diagram illustrating an example of a block configuration of a terminal apparatus 1 according to the present embodiment. The terminal apparatus 1 has a receive antenna (terminal receive antenna) 601, an OFDM signal reception unit (downlink reception unit) 602, a downlink subframe processing unit 603, a transport block extraction unit (data extraction unit) 605, a controller (terminal control unit) 606, a higher layer (higher layer control information acquisition) 607, a channel state measurement unit (CSI generation unit) 608, an uplink subframe generation unit 609, an SC-FDMA signal transmission unit (UCI transmission unit) 611 and 612, and a transmit antenna (terminal transmit antenna) 613 and 614. The downlink subframe processing unit 603 includes a downlink reference signal extraction unit 604. The uplink subframe generation unit 609 includes an uplink control information generation unit (UCI generation unit) 610. Note that the OFDM signal reception unit 602 also serves as a measurement unit of received signals, CCA, and interference noise power. In other words, RRM measurement may be performed in the OFDM signal reception unit 602. In a case that the terminal apparatus supports transmission of OFDM signals, the SC-FDMA signal transmission unit may be the OFDM signal transmission unit, or may include the OFDM signal transmission unit. Note that the uplink subframe generation unit may be an uplink TTI generation unit or may include a downlink TTI generation unit. The terminal apparatus may include a power control unit for controlling/setting the transmit power of the uplink signal. Note that, although not illustrated, the terminal apparatus may include a measurement unit for measuring a time difference between reception and transmission of the terminal apparatus. The terminal apparatus may include a transmitter configured to report the measurement result of the time difference.

In FIG. 7 and FIG. 8 respectively, the higher layer may include the Medium Access Control (MAC) layer, the Radio Link Control (RLC) layer, the Packet Data Convergence Protocol (PDCP) layer, and the Radio Resource Control (RRC) layer.

The RLC layer performs Transparent Mode (TM) data transmission to the higher layer, Unacknowledged Mode (UM) data transmission, and Acknowledged Mode (AM) data transmission including an indication for indicating that transmission of the higher layer Packet Data Unit (PDU) has succeeded. Data transmission to the lower layer is performed, and a transmission opportunity, together with the total size of the RLC PDU transmitted in the transmission opportunity is notified to the lower layer.

The RLC layer supports a function relating to transmission of the higher layer PDU, a function relating to error correction via an Automatic Repeat reQuest (ARQ) (only for AM data transmission), a function relating to combination/division/reconstruction of the RLC Service Data Unit (SDU) (only for UM and AM data transmission), a function relating to redivision of the RLC data PDU (only for AM data transmission), a function relating to sorting of the RLC data PDU (only for AM data transmission), a function relating to duplication detection (only for UM and AM data transmission), a function relating to discarding of RLC SDU (only for UM and AM data transmission), a function relating to re-establishment of the RLC, and a function relating to protocol error detection (only for AM data transmission).

First, a flow of downlink data transmission and/or reception will be described with reference to FIG. 7 and FIG. 8. In the base station apparatus 2, the controller 502 holds a Modulation and Coding Scheme (MCS) for indicating a modulation scheme, a coding rate, and the like in the downlink, downlink resource allocation for indicating RBs to be used for data transmission, and information to be used for HARQ control (a redundancy version, an HARQ process number, and an NDI) and controls the codeword generation unit 503 and the downlink subframe generation unit 504, based on these elements. The downlink data (also referred to as a downlink transport block, DL-SCH data, DL-SCH transport block) transmitted from the higher layer 501 is subjected to processing such as error correction coding and rate matching, under the control by the controller 502 in the codeword generation unit 503, and a codeword is generated. Two codewords at maximum are transmitted at the same time in a single subframe of a single cell. In the downlink subframe generation unit 504, a downlink subframe is generated in accordance with an indication from the controller 502. First, the codeword generated in the codeword generation unit 503 is converted into a modulation symbol sequence through a modulation process, such as Phase Shift Keying (PSK) modulation and Quadrature Amplitude Modulation (QAM). A modulation symbol sequence is mapped onto REs of some RBs, and a downlink subframe for each antenna port is generated through a precoding process. In this operation, a transmission data sequence transmitted from the higher layer 501 includes higher layer control information, which is control information on the higher layer (for example, dedicated (individual) Radio Resource Control (RRC) signaling). In the downlink reference signal generation unit 505, a downlink reference signal is generated. The downlink subframe generation unit 504 maps the downlink reference signal to the REs in the downlink subframes in accordance with an indication from the controller 502. The downlink subframe generated in the downlink subframe generation unit 504 is modulated to an OFDM signal in the OFDM signal transmission unit 506 and then transmitted via the transmit antenna 507. Note that, although a configuration including one OFDM signal transmission unit 506 and one transmit antenna 507 is provided as an example here, another configuration may include multiple OFDM signal transmission units 506 and transmit antennas 507 in a case that downlink subframes are transmitted by using multiple antenna ports. The downlink subframe generation unit 504 may also have the capability of generating physical layer downlink control channels, such as the PDCCH and the EPDCCH or a control channel/shared channel corresponding to the PDCCH and the EPDCCH, to map the channels to the REs in downlink subframes. Multiple base station apparatuses transmit separate downlink subframes.

In the terminal apparatus 1, the OFDM signal is received by the OFDM signal reception unit 602 via the receive antenna 601, and an OFDM demodulation process is performed on the received signal.

The downlink subframe processing unit 603 first detects physical layer downlink control channels, such as the PDCCH and the EPDCCH or a control channel corresponding to the PDCCH and the EPDCCH. More specifically, the downlink subframe processing unit 603 performs decoding on the assumption that the PDCCH and the EPDCCH or a control channel corresponding to the PDCCH and the EPDCCH has been transmitted in a region to which the PDCCH and the EPDCCH or a control channel/shared channel corresponding to the PDCCH and the EPDCCH are allocated, and checks preliminarily added Cyclic Redundancy Check (CRC) bits. In other words, the downlink subframe processing unit 603 monitors the PDCCH and the EPDCCH or a control channel/shared channel corresponding to the PDCCH and the EPDCCH. In a case that the CRC bits match an ID (a single terminal-specific identifier (UEID) assigned to a single terminal, such as a C-RNTI and a SPS-C-RNTI, or a Temporary C-RNTI) assigned by the base station apparatus beforehand, the downlink subframe processing unit 603 recognizes that the PDCCH and the EPDCCH or a control channel/shared channel corresponding to the PDCCH and the EPDCCH has been detected and extracts the PDSCH or a data channel/shared channel corresponding to the PDSCH by using control information included in the detected PDCCH or the EPDCCH or a control channel corresponding to the PDCCH or the EPDCCH.

The controller 606 holds an MCS for indicating a modulation scheme, a coding rate, and the like in the downlink based on the control information, downlink resource allocation for indicating a RB to be used for downlink data transmission, and information to be used for HARQ control, and controls the downlink subframe processing unit 603, the transport block extraction unit 605, and the like, based on these parameters/information. More specifically, the controller 606 controls so as to perform an RE demapping process, a demodulation process, and the like that correspond to an RE mapping process and a modulation process in the downlink subframe generation unit 504. The PDSCH extracted from the received downlink subframe is transmitted to the transport block extraction unit 605. The downlink reference signal extraction unit 604 in the downlink subframe processing unit 603 extracts the DLRS from the downlink subframe.

The transport block extraction unit 605 performs a rate matching process, an error correction decoding, and the like that correspond to a rate matching process and an error correction coding in the codeword generation unit 503, and a transport block is extracted and transmitted to the higher layer 607. The transport block includes the higher layer control information, and the higher layer 607 notifies the controller 606 of a necessary physical layer parameter, based on the higher layer control information. Note that the multiple base station apparatuses 2 transmit separate downlink subframes respectively, and the terminal apparatus 1 receives the downlink subframes. Hence, the above-described processes may be carried out for the downlink subframe of each of the multiple base station apparatuses 2. In this situation, the terminal apparatus 1 may recognize or may not necessarily recognize that multiple downlink subframes have been transmitted from the multiple base station apparatuses 2. In a case that the terminal apparatus 1 does not recognize the subframes, the terminal apparatus 1 may simply recognize that multiple downlink subframes have been transmitted in multiple cells. The transport block extraction unit 605 determines whether or not the transport block has been detected correctly and transmits a result of the determination to the controller 606.

Here, the transport block extraction unit 605 may include a buffer unit (soft buffer unit). The buffer unit is capable of temporarily storing information of the extracted transport block. For example, the transport block extraction unit 605, in a case of receiving a same transport block (retransmitted transport block), attempts to combine (compose) the data for the transport block temporarily stored in the buffer unit with the newly received data and decode the combined data, provided that decoding of the data for the transport block has not succeeded. In a case that the temporarily stored data is no longer necessary, or satisfies a prescribed condition, the buffer unit flushes the data. The condition of the data to be flushed may vary according to the type of transport block corresponding to the data. The buffer unit may be prepared for each type of data. For example, a message 3 buffer or a HARQ buffer may be prepared as the buffer unit, or the buffer unit may be prepared for each layer such as L1/L2/L3. Note that, flushing of information/data implies flushing a buffer storing information or data therein.

Next, a flow of uplink signal transmission and/or reception will be described. In the terminal apparatus 1, a downlink reference signal extracted by the downlink reference signal extraction unit 604 is transmitted to the channel state measurement unit 608 under the indication from the controller 606, the channel state and/or interference is measured by the channel state measurement unit 608, and further CSI is calculated based on the measured channel state and/or interference. The controller 606 indicates to the uplink control information generation unit 610 to generate an HARQ-ACK (DTX (not transmitted yet), ACK (detection succeeded), or NACK (detection failed)) and map the resultant to a downlink subframe, based on a result of the determination of whether or not the transport block is correctly detected. The terminal apparatus 1 performs these processes on the downlink subframe of each of multiple cells. In the uplink control information generation unit 610, a PUCCH including the calculated CSI and/or HARQ-ACK, or a control channel/shared channel corresponding to the PUCCH is generated. In the uplink subframe generation unit 609, the PUSCH or a data channel/shared channel corresponding to the PUSCH including the uplink data transmitted from the higher layer 607 and the PUCCH or the control channel generated by the uplink control information generation unit 610 are mapped to the RBs in an uplink subframe to generate an uplink subframe.

The SC-FDMA signal is received by the SC-FDMA signal reception unit 509 via the receive antenna 508, and an SC-FDMA demodulation process is performed. The uplink subframe processing unit 510 extracts the RB to which the PUCCH is mapped, according to an indication from the controller 502, and the uplink control information extraction unit 511 extracts the CSI included in the PUCCH. The extracted CSI is sent to the controller 502. The CSI is used for control of downlink transmission parameters (MCS, downlink resource allocation, HARQ, and the like) by the controller 502. Note that the SC-FDMA signal reception unit may be the OFDM signal reception unit. The SC-FDMA signal reception unit may include the OFDM signal reception unit.

The base station apparatus assumes maximum output power PCMAX configured by the terminal apparatus from a power head room report, and based on the physical uplink channel received from the terminal apparatus, assumes the upper limit value of the power for each physical uplink channel Based on these assumptions, the base station apparatus determines the value of the transmission power control command for the physical uplink channel, and transmits the determined value to the terminal apparatus by using the PDCCH with the downlink control information format. With this operation, the power adjustment of the transmit power of the physical uplink channel/signal (or the uplink physical channel/physical signal) transmitted from the terminal apparatus is performed.

In a case that the base station apparatus transmits the PDCCH (EPDCCH)/PDSCH (or the shared channel/control channel of the LR cell corresponding thereto) for the terminal apparatus, the base station apparatus performs resource allocation of the PDCCH/PDSCH so as not to allocate resources of the PBCH (or the broadcast channel corresponding to the PBCH).

The PDSCH may be used to transmit messages/information for each of the SIB/RAR/paging/unicast for the terminal apparatus.

The frequency hopping for the PUSCH may be configured individually depending on the type of grant. For example, the values of the parameters used for the frequency hopping of the PUSCH corresponding to each of a dynamic schedule grant, a semi-persistent grant, and an RAR grant may be configured individually. The parameters may not be indicated by an uplink grant. The parameters may be configured via higher layer signaling including system information.

The various parameters described above may be configured for each physical channel. The various parameters described above may be configured for each terminal apparatus. The parameters described above may be configured in common among terminal apparatuses. Here, the various parameters described above may be configured by using system information. The various parameters described above may be configured by using higher layer signaling (RRC signaling, MAC CE). The various parameters described above may be configured by using the PDCCH/EPDCCH. The various parameters described above may be configured as broadcast information. The various parameters described above may be configured as unicast information.

Note that, in the embodiments described above, a power value required for the transmission of each PUSCH has been described as being calculated based on the parameters configured by the higher layer, an adjustment value determined based on the number of PRBs allocated to the PUSCH transmission by resource assignment, downlink path loss and a coefficient by which the path loss is multiplied, an adjustment value determined based on the parameter indicating the offset of the MCS applied to the UCI, a value based on a TPC command, and the like. A power value required for the transmission of each PUCCH has been described as being calculated based on parameters configured by the higher layer, downlink path loss, an adjustment value determined based on the UCI transmitted by the PUCCH, an adjustment value determined based on the PUCCH format, an adjustment value determined based on the number of antenna ports used for the transmission by the PUCCH, a value based on a TPC command, and the like. However, it is not limited to this. An upper limit value may be set for the required power value, and the smallest value of the value based on the above-described parameters and the upper limit value (for example, PCMAX, c, which is the maximum output power value of the serving cell c) may be used as the required power value.

A program running on the base station apparatus and the terminal apparatus according to an aspect of the present invention may be a program (program that causes a computer to function) that controls a Central Processing Unit (CPU) and the like, such that the program realizes the functions of the above-described embodiment according to an aspect of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that a part of the terminal apparatus and/or the base station apparatus described in the above embodiment may be realized by a computer. In such a case, a program for realizing such control functions may be recorded on a computer-readable recording medium to cause a computer system to read the program recorded on the recording medium for execution.

Note that a "computer system" is intended to be a computer system built in the terminal apparatus or the base station apparatus, and include an OS and hardware such as peripheral devices. A "computer-readable recording medium" refers to a portable medium such as a flexible disk, a magneto-optical disk, a ROM, a CD-ROM, and the like, and a storage device such as a hard disk built into the computer system.

Furthermore, a "computer-readable recording medium" may include a medium, such as a communication line for transmitting the program via a network such as the Internet or via a communication circuit such as a telephone circuit, that dynamically holds a program for a short period of time, or a medium, such as a volatile memory in the computer system serving as a server or a client in such a case, that holds the program for a certain period of time. The above-described program may be configured to realize some of the functions described above, and additionally may be configured to realize the functions described above, in combination with a program already recorded in the computer system.

The base station apparatus according to the above-described embodiment may be realized as an aggregation (apparatus group) including multiple apparatuses. Each of the apparatuses constituting an apparatus group may include some or all of the functions or functional blocks of the base station apparatus according to the above-described embodiment. The apparatus group is required to have a complete set of functions or functional blocks of the base station apparatus. The terminal apparatus according to the above-described embodiment is also capable of communicating with the base station apparatus as the aggregation.

The base station apparatus according to the above-described embodiment may be EUTRAN. The base station apparatus 2 according to the above-described embodiment may have some or all of the functions of a node higher than an eNodeB.

Some or all of the terminal apparatus and the base station apparatus according to the above-described embodiment may be realized as an LSI, which is typically an integrated circuit, or as a chip set. Each functional block of the terminal apparatus and the base station apparatus may be individually realized as a chip, or some or all of the functional blocks may be integrated into a chip. The integrated circuit technique is not limited to LSI, and may be realized as a dedicated circuit or a general-purpose processor. In a case that with advances in semiconductor technology, a circuit integration technology with which an LSI is replaced appears, it is also possible to use an integrated circuit based on the technology.

Although a cellular mobile station apparatus (cellular phone, mobile apparatus) has been described as an example of the terminal apparatus or the communication apparatus in the above-described embodiments, the present invention is not limited thereto, and may be applied to a terminal apparatus or a communication apparatus of a stationary, or non-mobile electronic apparatus installed indoors or outdoors such as an AV apparatus, kitchen equipment (for example, a refrigerator or a micro-wave oven), a vacuum cleaner or a washing machine, an air-conditioning apparatus, office equipment, a vending a machine, a car-mounted apparatus such as car navigation device, and other household apparatuses.

The embodiments described above of the present invention have been described in detail above referring to the drawings, but the specific configuration is not limited to the embodiments and includes, for example, an amendment to a design that falls within the scope that does not depart from the gist of the present invention. Various modifications are possible within the scope of an aspect of the present invention defined by claims, and embodiments that are made by suitably combining technical means disclosed according to the different embodiments are also included in the technical scope of the present invention. A configuration in which components mentioned in the above-described embodiments and exhibiting similar effects are substituted for each other may also be included.

As has been described above, an aspect of the present invention provides the following characteristics.

(1) A base station apparatus according to an aspect of the present invention includes a transmitter configured to transmit an EUTRA NR Dual Connectivity (EN-DC) configuration and a Downlink Control Information (DCI) format, wherein in a case that a parameter related to single transmission for an EUTRA cell is set in the EN-DC configuration, and that a duplex mode of a primary cell is a Frequency Division Duplex (FDD), the number of bits in an HARQ process number (HPN) field included in the DCI format is set to four bits in a case that the DCI format is mapped to a UE-specific Search Space (USS) given by a Cell Radio Network Temporary Identifier (C-RNTI), and the number of bits in the HPN field included in the DCI format is set to three bits in a case that the DCI format is mapped to a Common Search Space (CSS).

(2) A terminal apparatus according to an aspect of the present invention includes a receiver configured to receive an EUTRA NR Dual Connectivity (EN-DC) configuration and a Downlink Control Information (DCI) format, wherein in a case that a parameter related to single transmission for an EUTRA cell is configured in the EN-DC configuration, and that a duplex mode of a primary cell is a Frequency Division Duplex (FDD), decoding is performed in such a manner that the number of bits in an HARQ process number (HPN) field included in the DCI format is set to four bits in a case that the DCI format is mapped to a UE-specific Search Space (USS) given by a Cell Radio Network Temporary Identifier (C-RNTI), and decoding is performed in such a manner that the number of bits in the HPN field included in the DCI format is set to three bits in a case that the DCI format is mapped to a Common Search Space (CSS).

(3) A method according to an aspect of the present invention is a method for a base station apparatus, the method including the steps of: transmitting an EUTRA NR Dual Connectivity (EN-DC) configuration and a Downlink Control Information (DCI) format; in a case that a parameter related to single transmission for an EUTRA cell is set in the EN-DC configuration, and that a duplex mode of a primary cell is a Frequency Division Duplex (FDD), setting the number of bits in an HARQ process number (HPN) field included in the DCI format to four bits in a case that the DCI format is mapped to a UE-specific Search Space (USS) given by a Cell Radio Network Temporary Identifier (C-RNTI); and setting the number of bits in the HPN field included in the DCI format to three bits in a case that the DCI format is mapped to a Common Search Space (CSS).

(4) A method according to an aspect of the present invention is a method for a terminal apparatus, the method including the steps of: receiving an EUTRA NR Dual Connectivity (EN-DC) configuration and a Downlink Control Information (DCI) format; in a case that a parameter related to single transmission for an EUTRA cell is configured in the EN-DC configuration, and in a case that a duplex mode of a primary cell is a Frequency Division Duplex (FDD), performing decoding in such a manner that the number of bits in an HARQ process number (HPN) field included in the DCI format is set to four bits in a case that the DCI format is mapped to a UE-specific Search Space (USS) given by a Cell Radio Network Temporary Identifier (C-RNTI); and performing decoding in such a manner that the number of bits in the HPN field included in the DCI format is set to three bits in a case that the DCI format is mapped to a Common Search Space (CSS).

(5) A base station apparatus according to an aspect of the present invention includes a transmitter configured to transmit an EUTRA NR Dual Connectivity (EN-DC) configuration and a configuration related to an EUTRA cell, wherein in a case that a parameter related to single transmission for the EUTRA cell is included in the EN-DC configuration, and that an EUTRA Cell Group (CG) includes at least one Time Division Duplex (TDD) cell, a value of harq-Offset-r15 is set to 0.

(6) A terminal apparatus according to an aspect of the present invention includes a receiver configured to transmit an EUTRA NR Dual Connectivity (EN-DC) configuration and a configuration related to an EUTRA cell, wherein in a case that a parameter related to single transmission for the EUTRA cell is included in the EN-DC configuration, and that an EUTRA Cell Group (CG) includes at least one Time Division Duplex (TDD) cell, a DL reference UL/DL configuration for HARQ-ACK transmission is determined by assuming that a value of harq-Offset-r15 is set to 0.

(7) A method according to an aspect of the present invention is a method for a base station apparatus, the method including the steps of: transmitting an EUTRA NR Dual Connectivity (EN-DC) configuration and a configuration related to an EUTRA cell; and in a case that a parameter related to single transmission for the EUTRA cell is included in the EN-DC configuration, and that an EUTRA Cell Group (CG) includes at least one Time Division Duplex (TDD) cell, setting a value of harq-Offset-r15 to 0.

(8) A method according to an aspect of the present invention is a method for a terminal apparatus, the method including the steps of: transmitting an EUTRA NR Dual Connectivity (EN-DC) configuration and a configuration related to an EUTRA cell; in a case that a parameter related to single transmission for the EUTRA cell is included in the EN-DC configuration, and that an EUTRA Cell Group (CG) includes at least one Time Division Duplex (TDD) cell, determining a DL reference UL/DL configuration for HARQ-ACK transmission by assuming that a value of harq-Offset-r15 is set to 0.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

The invention claimed is:

1. A terminal apparatus comprising:
a receiver configured to receive a DCI (Downlink Control Information) format being used for scheduling of a PDSCH (Physical Downlink Shared CHannel), and a higher layer parameter including a parameter subframeAssignment-r15, the higher layer parameter being included in an RRC (Radio Resource Control) connection reconfiguration message; and
a transmitter configured to transmit a HARQ-ACK (Hybrid Automatic Repeat request ACKnowledgement) corresponding to the PDSCH,
wherein, in a case that a duplex mode of a primary cell is FDD (Frequency Division Duplex), whether a number of bits of a HARQ process number field in the DCI format is 3 bits or 4 bits is determined based on whether EN-DC (Evolved universal terrestrial radio access network New radio Dual Connectivity) is configured, whether the higher layer parameter including the parameter subframeAssignment-r15 is configured, and whether the DCI format is mapped to a USS (UE (user equipment) specific search space) given by a C-RNTI (cell radio network temporary identifier).

2. The terminal apparatus according to claim 1, wherein the number of bits of the HARQ process number field in the DCI format is 4 bits, in a case that the duplex mode of the primary cell is FDD, the EN-DC is configured, the higher layer parameter including the parameter subframeAssignment-r15 is configured, and the DCI format is mapped to the USS given by the C-RNTI.

3. The terminal apparatus according to claim 1, wherein the number of bits of the HARQ process number field in the DCI format is 3 bits, in a case that the duplex mode of the primary cell is FDD, the EN-DC is configured, the higher layer parameter including the parameter subframeAssignment-r15 is configured, and the DCI format is mapped to a CSS (Common Search Space).

4. A base station apparatus comprising:
a transmitter configured to transmit a DCI (Downlink Control Information) format being used for scheduling of a PDSCH (Physical Downlink Shared CHannel), and a higher layer parameter including a parameter subframeAssignment-r15, the higher layer parameter being included in an RRC (Radio Resource Control) connection reconfiguration message; and
a receiver configured to receive a HARQ-ACK (Hybrid Automatic Repeat request ACKnowledgement) corresponding to the PDSCH,
wherein, in a case that a duplex mode of a primary cell is FDD (Frequency Division Duplex), whether a number of bits of a HARQ process number field in the DCI format is 3 bits or 4 bits is determined based on whether EN-DC (Evolved universal terrestrial radio access network New radio Dual Connectivity) is configured, whether the higher layer parameter including the parameter subframeAssignment-r15 is configured, and whether the DCI format is mapped to a USS (UE (user equipment) specific search space) given by a C-RNTI (cell radio network temporary identifier).

5. The base station apparatus according to claim 4, wherein
the number of bits of the HARQ process number field in the DCI format is 4 bits, in a case that the duplex mode of the primary cell is FDD, the EN-DC is configured, the higher layer parameter including the parameter subframeAssignment-r15 is configured, and the DCI format is mapped to the USS given by the C-RNTI.

6. The base station apparatus according to claim 4, wherein
the number of bits of the HARQ process number field in the DCI format is 3 bits, in a case that the duplex mode of the primary cell is FDD, the EN-DC is configured, the higher layer parameter including the parameter subframeAssignment-r15 is configured, and the DCI format is mapped to a CSS (Common Search Space).

7. A communication method of a terminal apparatus comprising:
receiving a higher layer parameter including a parameter subframeAssignment-r15, the higher layer parameter being included in an RRC (Radio Resource Control) connection reconfiguration message;
receiving a DCI (Downlink Control Information) format being used for scheduling of a PDSCH (Physical Downlink Shared CHannel); and
transmitting a HARQ-ACK (Hybrid Automatic Repeat request ACKnowledgement) corresponding to the PDSCH,
wherein, in a case that a duplex mode of a primary cell is FDD (Frequency Division Duplex), whether a number of bits of a HARQ process number field in the DCI format is 3 bits or 4 bits is determined based on whether EN-DC (Evolved universal terrestrial radio access network New radio Dual Connectivity) is configured, whether the higher layer parameter including the parameter subframeAssignment-r15 is configured, and whether the DCI format is mapped to a USS (UE (user equipment) specific search space) given by a C-RNTI (cell radio network temporary identifier).

8. The communication method according to claim 7, wherein
the number of bits of the HARQ process number field in the DCI format is 4 bits, in a case that the duplex mode of the primary cell is FDD, the EN-DC is configured, the higher layer parameter including the parameter subframeAssignment-r15 is configured, and the DCI format is mapped to the USS given by the C-RNTI.

9. The communication method according to claim 7, wherein the number of bits of the HARQ process number field in the DCI format is 3 bits, in a case that the duplex mode of the primary cell is FDD, the EN-DC is configured, the higher layer parameter including the parameter subframeAssignment-r15 is configured, and the DCI format is mapped to a CSS (Common Search Space).

10. A communication method of a base station apparatus comprising:

transmitting a higher layer parameter including a parameter subframeAssignment-r15, the higher layer parameter being included in an RRC (Radio Resource Control) connection reconfiguration message;

transmitting a DCI (Downlink Control Information) format being used for scheduling of a PDSCH (Physical Downlink Shared CHannel); and receiving a HARQ-ACK (Hybrid Automatic Repeat request ACKnowledgement) corresponding to the PDSCH, wherein, in a case that a duplex mode of a primary cell is FDD (Frequency Division Duplex), whether a number of bits of a HARQ process number field in the DCI format is 3 bits or 4 bits is determined based on whether EN-DC (Evolved universal terrestrial radio access network New radio Dual Connectivity) is configured, whether the higher layer parameter including the parameter subframeAssignment-r15 is configured, and whether the DCI format is mapped to a USS (UE (user equipment) specific search space) given by a C-RNTI (cell radio network temporary identifier).

11. The communication method according to claim 10, wherein the number of bits of the HARQ process number field in the DCI format is 4 bits, in a case that the duplex mode of the primary cell is FDD, the EN-DC is configured, the higher layer parameter including the parameter subframeAssignment-r15 is configured, and the DCI format is mapped to the USS given by the C-RNTI.

12. The communication method according to claim 10, wherein the number of bits of the HARQ process number field in the DCI format is 3 bits, in a case that the duplex mode of the primary cell is FDD, the EN-DC is configured, the higher layer parameter including the parameter subframeAssignment-r15 is configured, and the DCI format is mapped to a CSS (Common Search Space).

* * * * *